(12) United States Patent
Martin et al.

(10) Patent No.: US 7,583,687 B2
(45) Date of Patent: Sep. 1, 2009

(54) LOCK-FREE DOUBLE-ENDED QUEUE BASED ON A DYNAMIC RING

(75) Inventors: Paul A. Martin, Arlington, MA (US);
Guy L. Steele, Lexington, MA (US);
Christine H. Flood, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 761 days.

(21) Appl. No.: 11/325,209

(22) Filed: Jan. 3, 2006

(65) Prior Publication Data

US 2007/0157214 A1    Jul. 5, 2007

(51) Int. Cl.
*H04L 12/28* (2006.01)
*G06F 9/46* (2006.01)

(52) U.S. Cl. .................................. 370/412; 719/314

(58) Field of Classification Search ............... 370/412; 719/314
See application file for complete search history.

(56) References Cited

U.S. PATENT DOCUMENTS

| | | | |
|---|---|---|---|
| 6,826,757 B2 | 11/2004 | Steele, Jr. et al. | 719/314 |
| 6,993,770 B1 * | 1/2006 | Detlefs et al. | 719/315 |
| 7,000,234 B1 * | 2/2006 | Shavit et al. | 719/315 |
| 7,017,160 B2 * | 3/2006 | Martin et al. | 719/315 |

OTHER PUBLICATIONS

Publication: *"DCAS-based Concurrent Deques Supporting Bulk Allocation"*, by Paul Martin et al., SUN Microsystems, Inc. Report No. SMLI TR-2002-111, Oct. 2002, pp. 1-17.
Publication: *"CAS-Based Lock-Free Algorithm for Shared Deques"*, by Maged M. Michael, Euro-Par 2003, The Ninth Euro-Par Conference on Parallel Processing, LNCS vol. 2790, pp. 651-660, Aug. 2003.
Publication: *"Lock-Free and Practical Deques using Single-Word Compare-And-Swap"*, by Hakan Sundell and Philippas Tsigas, Technical Report in Computing Science at Chalmers University of Technology and Goteborg University, Sweden, Technical Report No. 2004-02, ISSN: 1650-3023, 2004.

* cited by examiner

*Primary Examiner*—Andrew Lee
(74) *Attorney, Agent, or Firm*—Park, Vaughan & Fleming LLP

(57) ABSTRACT

One embodiment of the present invention provides a system that facilitates performing operations on a lock-free double-ended queue (deque). This deque is implemented as a doubly-linked list of nodes formed into a ring, so that node pointers in one direction form an inner ring, and node pointers in the other direction form an outer ring. The deque has an inner hat, which points to a node next to the last occupied node along the inner ring, and an outer hat, which points to a node next to the last occupied node along the outer ring. The system uses a double compare-and-swap (DCAS) operation while performing pop and push operations onto either end of the deque, as well as growing and shrinking operations to change the number of nodes that are in the ring used by the deque.

22 Claims, 32 Drawing Sheets

LOCK-FREE DOUBLE-ENDED QUEUE BASED ON A DYNAMIC RING

BACKGROUND

1. Field of the Invention

The present invention relates to the design of lock-free data structures to facilitate multi-threaded processing within computer systems. More specifically, the present invention relates to a method and apparatus for implementing a practical, lock-free double-ended queue.

2. Related Art

Computational operations involving data structures become more complicated in a multi-threaded environment, because concurrently executing threads can potentially interfere with each other while accessing the same data structures. In order to prevent such interference, some systems control accesses to data structures by using locks to prevent different threads from interfering with each other. Unfortunately, locks often cause processes to stall, which can lead to significant performance problems, especially in systems that support large numbers of concurrently executing processes.

Because of the performance problems that arise from locks, a number of researchers have developed "lock-free" data structures, such as linked lists, that operate efficiently in a multi-threaded environment. Harris describes a way to build and modify a lock-free linked list that can be constructed using only load-linked (LL)/store-conditional (SC) or compare-and-swap (CAS) instructions (see Timothy L. Harris, "A Pragmatic Implementation of Non-Blocking Linked-Lists," *Proceedings of the 15th International Symposium on Distributed Computing,* October 2001, pp. 300-14). Michael uses a variant of the Harris linked-list as the underlying structure for a lock-free hash table (see Maged M. Michael, "High Performance Dynamic Lock-Free Hash Tables and List-Based Sets," *The 14th Annual ACM Symposium on Parallel Algorithms and Architectures,* pages 73-82, August 2002).

Additionally, a number of researchers have developed lock-free double-ended queues (deques). A deque is an important data structure for achieving computational efficiency in a diverse range of applications. A deque allows data to be pushed or popped from either end, and a "lock-free" deque allows these operations to be performed concurrently by independent threads.

The simplest deques have a static size that is determined at the start. For some examples, see Ole Ageson et al., "DCAS-based Concurrent Deques", *Proceedings of the Twelfth Annual ACM Symposium on Parallel Algorithms and Architectures,* pp. 137-146, 2000.

As a deque grows, nodes can be dynamically allocated for the deque, and when the deque shrinks, nodes can be dynamically deallocated from the deque. The first published lock-free dynamic deque is in, "Even Better DCAS-Based Deques," by Detlefs et al., *Proceedings of the Fourteenth International Symposium on Distributed Computing,* pp. 59-73, October 2000. However, these dynamic memory allocation and deallocation operations can be very time-consuming to perform in a multi-threaded system.

Hence, what is needed is a method and an apparatus for implementing a deque that is lock-free and is able to grow and shrink without having to perform as many time-consuming memory allocation and deallocation operations. Such a design has been published in a technical report from Sun Microsystems Labs TR-20020-111, "DCAS-based Concurrent Deques Supporting Bulk Allocation," by Paul Martin et al 2002. This design (called "HatTrick") allows the same memory to be used repeatedly to hold the items of the deque, rather than requiring an allocation and release for each item. The underlying data structure is linear, however, so the best re-use occurs when the number of pushes and pops on a specific end of the deque during a modest period of time are roughly the same. This condition is met when most items are eventually popped from the same end of the deque to which they were originally pushed, that is the deque is used primarily like two stacks.

If the usage is less regular, or if the most common behavior of an item is to push it on one end and pop it from the other (queue-like usage), then the reuse is reduced as the active portion of the deque relentlessly shifts away from the end that experiences the majority of pops. This requires some allocation of memory to add onto the end that is experiencing the majority of the pushes, and recovery of memory from the excess-pops end.

An underlying data structure with a ring topology allows re-use of nodes limited only by the relative stability of the size of the structure. It offers all the advantages of the linear bulk-allocation system, and can also re-use its storage indefinitely when the deque is being used in an unbalanced queue-like manner—the live data simply cycles around the ring of available storage. The current invention, which is described below, embodies these features.

SUMMARY

One embodiment of the present invention provides a system that facilitates popping a value from a lock-free double-ended queue (deque). During operation, the system receives a command to pop a value from a selected end of the deque. This deque is implemented as a doubly-linked list of nodes formed into a ring, so that node pointers in one direction form an inner ring, and node pointers in the other direction form an outer ring. The deque has an inner hat, which points to a node next to the last occupied node along the inner ring, and an outer hat, which points to a node next to the last occupied node along the outer ring. In response to the command, the system attempts to perform a double compare-and-swap (DCAS) operation, wherein the DCAS operation predicts that the hat for the selected end of the deque remains unchanged and that the value in the node to be popped (located in a closest node to the hat in the popping direction) remains unchanged, is not null and is not a special value. If this DCAS operation succeeds, the system returns the value, sets the corresponding value field in the node-to-be-popped to null, and updates the hat to point to the node that held the value.

In a variation on this embodiment, the system receives a command to push a new value onto a selected end of the deque. In response to this command, the system attempts to perform a DCAS operation which predicts that the hat for the selected end remains unchanged and that the value in the node under the hat is null. If this DCAS operation succeeds, the value in the node under the hat is updated with the new value, and the hat for the selected end is advanced in the pushing direction.

In a variation on this embodiment, the system is configured to grow the ring to increase the number of nodes that can be used in the deque. This involves removing a segment containing the inactive nodes, if any, from the ring, and splicing in a new segment containing a larger number of inactive nodes into the ring.

In a further variation, while splicing in the new segment into the ring, the system first creates the new segment in a private memory area, wherein some nodes in the new segment are initialized to contain special values. Next, the system points boundary nodes at the ends of the segment to "splice points" in the original ring. The system then uses a DCAS operation to "slam" both the inner hat and the outer hat onto the new segment, so that the inner hat and outer hat point to nodes in the new segment. Finally, the system completes the splicing operation (possibly through other processes) by copying values, if necessary, fixing pointers in the original ring, and updating special values as needed.

In a further variation, the special values include: an E-marker, which indicates that the node is to be excluded from the resulting ring after splicing; an S-marker, which indicates that a splicing operation involving the node is still in-progress; and a W-marker, which indicates that data should be copied into the node during the splicing operation.

In a variation on this embodiment, the system is configured to shrink the ring to decrease the number of nodes that can be used in the deque. This involves removing a segment containing the inactive nodes from the ring, and splicing in a new segment containing a smaller number of inactive nodes into the ring.

In a variation on this embodiment, the fact that the deque is lock-free means that the deque can be simultaneously accessed by multiple processes without requiring the processes to perform locking operations, and furthermore that a finite number of steps taken by a process will guarantee progress by at least one process.

In a variation on this embodiment, the system is a shared-memory multiprocessor system which facilitates lock-free operations on the deque.

In a further variation, performing the DCAS operation involves executing a special-purpose DCAS instruction which is implemented by special-purpose hardware within the shared-memory multiprocessor system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Computer System

Figure 1A:
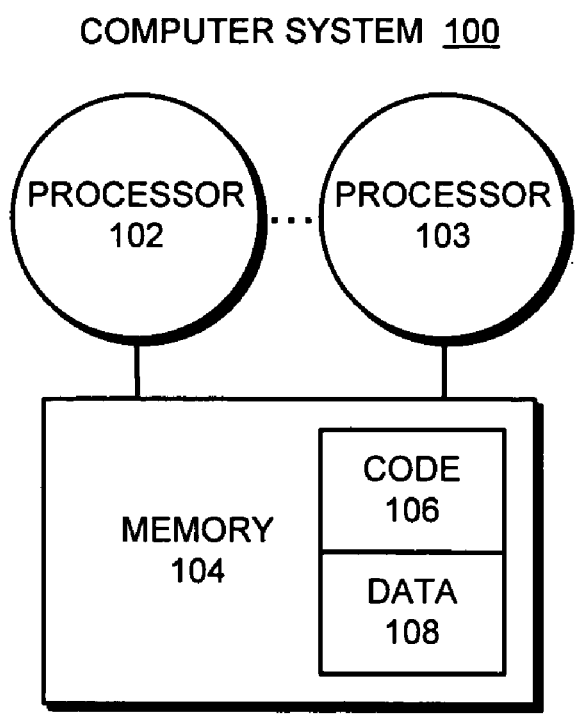
FIG. 1A illustrates a computer system in accordance with an embodiment of the present invention.
Figure 1B:
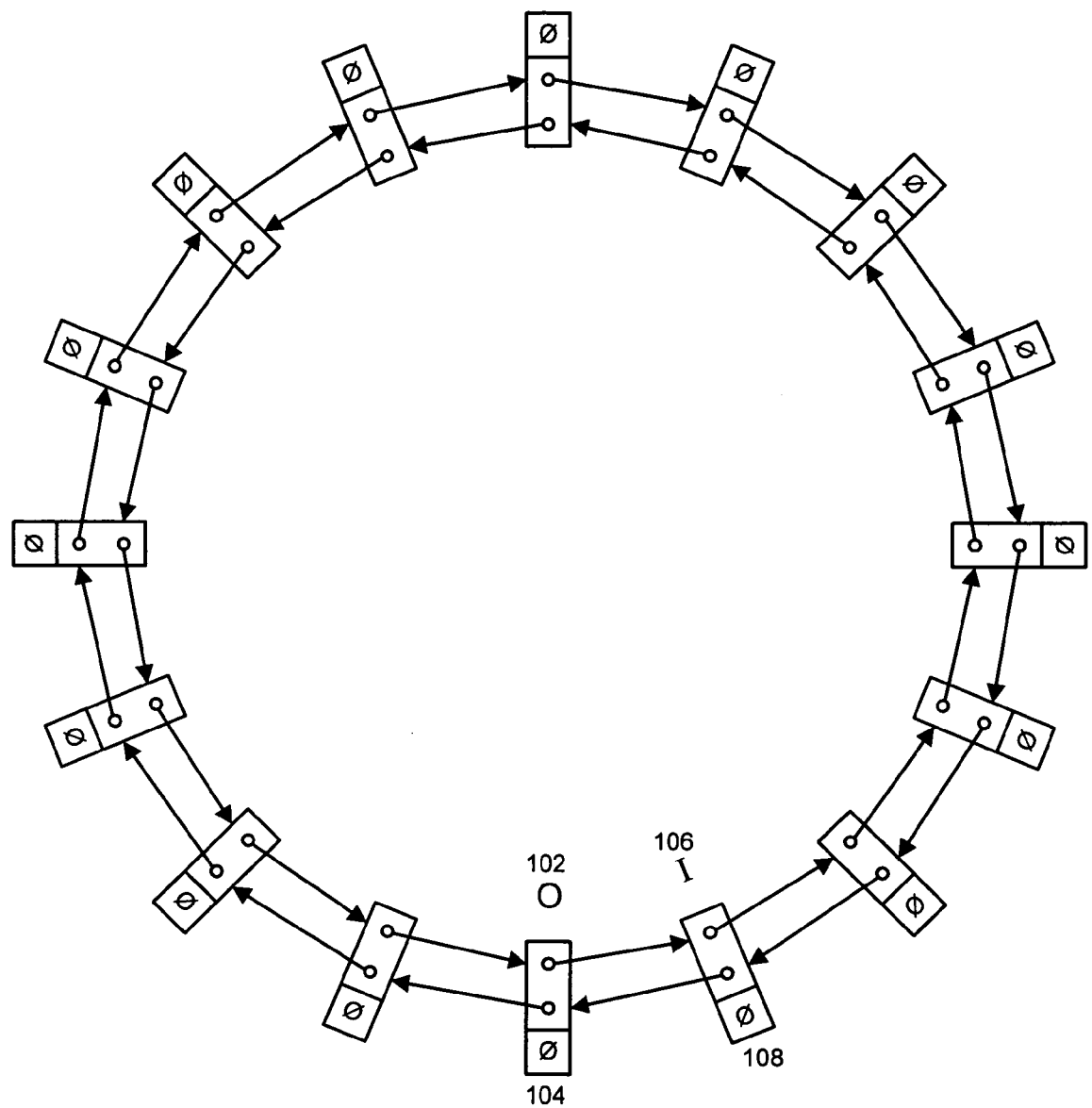
FIG. 1B illustrates an empty HatRing in accordance with an embodiment of the present invention.

FIG. 1 illustrates a computer system 100 in accordance with an embodiment of the present invention. Computer system 100 can generally include any type of computer system with one or more processors. Hence, computer system 100 can include, but is not limited to, a microprocessor, a mainframe computer, a digital processor, a personal computing device, a personal organizer, a device controller, and a computational engine within an appliance—in all these cases the system may have a single processor or multiple processors.

Computer system 100 includes one or more processors 102-103 that access a memory 104. Memory 104 contains code 106 that performs the below-described linked list operations. Memory also stores data 108, which includes the data structures and other variables associated with the below-described lock-free deque operations.

HatRing Deque

The "HatRing" deque uses a doubly linked-list structure to support a deque. It resembles the HatTrick data structure in its reliance on "moving the hat" to convert a sentinel node to an "active" one when pushing on a value and the inverse move when popping, and its storage capacity can be expanded and contracted as needed. (Besides the above-mentioned technical report, HatTrick appears in Published U.S. Patent Application No. 20010047361, entitled "Concurrent Shared Object Implemented Using a Linked List with Amortized Node Allocation," by inventors Martin et al. This patent application is hereby incorporated by reference to provide details of how the HatTrick data structure operates.) HatRing's primary advantage over the HatTrick is that the linked list of spare nodes forms a ring, so that under the condition of queue-like usage of the deque (where most pushes to the deque happen at one end and most pops happen at the other end), the active portions of the deque simply rotate around the ring without requiring any allocation or deallocation activities. See FIG. 1B for a typical HatRing deque with no active items in it.

Deque Ends

Figure 2:
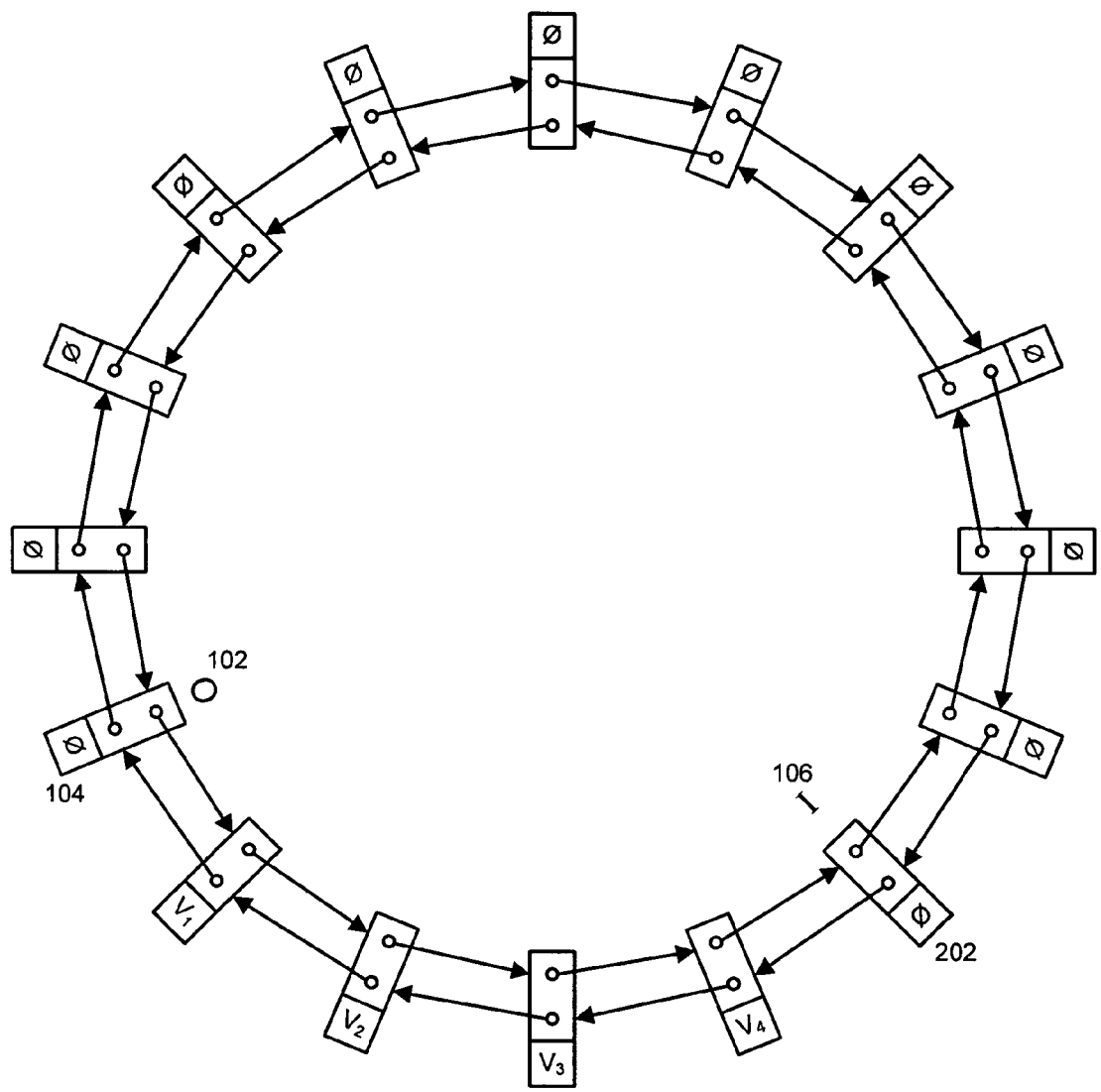
FIG. 2 illustrates a HatRing containing four values in accordance with an embodiment of the present invention.

Since the linked structure forms a ring, there is no "right" or "left" end; the two ends of the deque are designated "inner" and "outer" corresponding to which pointer that is followed when pushing a new data item onto the deque. The pointers are named by envisioning the ring of doubly-linked nodes as a circle connected by an inner ring of unidirectional pointers and also by an outer ring of pointers all performing the inverse connection. See FIG. 2 for an example of a typical HatRing deque holding four items. The "I" and "O" in the diagram indicate which nodes are pointed to by the Inner Hat and Outer Hat respectively. An outer pop would return $V_1$ and inner pop would return $V_4$.

New HatRing

Figure 3:
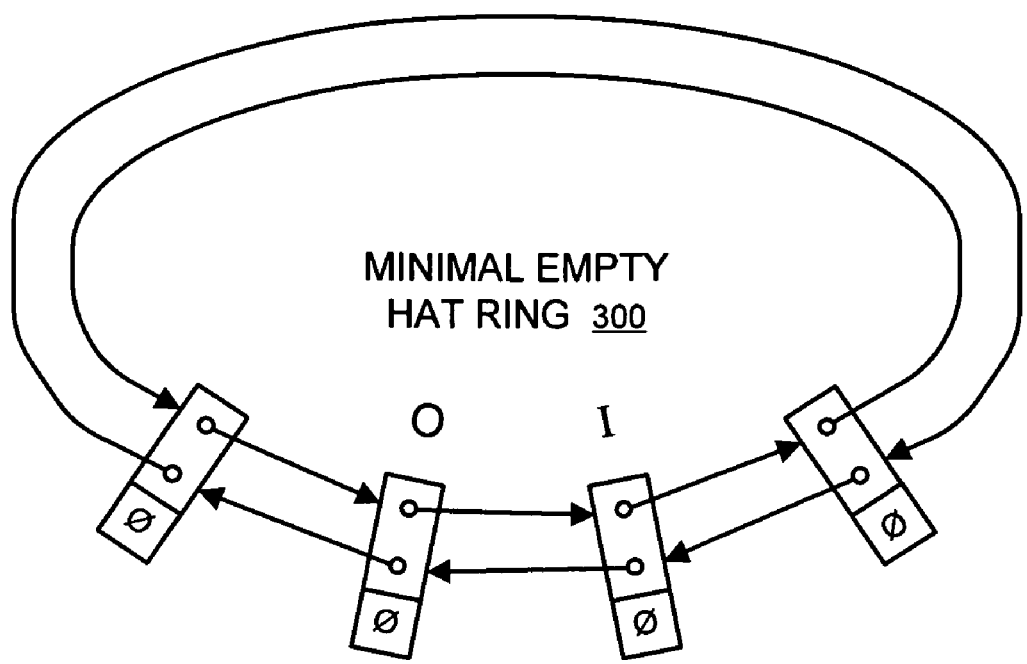
FIG. 3 illustrates a minimal empty HatRing in accordance with an embodiment of the present invention.

The initial creation of the deque is just a call to allocate a "spare" ring of linked, initialized nodes, plus assigning the Inner Hat and Outer Hat to adjacent "empty" positions in the ring. The result will look like FIG. 1 with variation only according to what initial size is chosen. Four nodes is a workable minimum ring; resizing destroys at least two nodes of a ring, so the technique does not choose any ring initially smaller than four (see FIG. 3).

Popping Values

Figure 4:
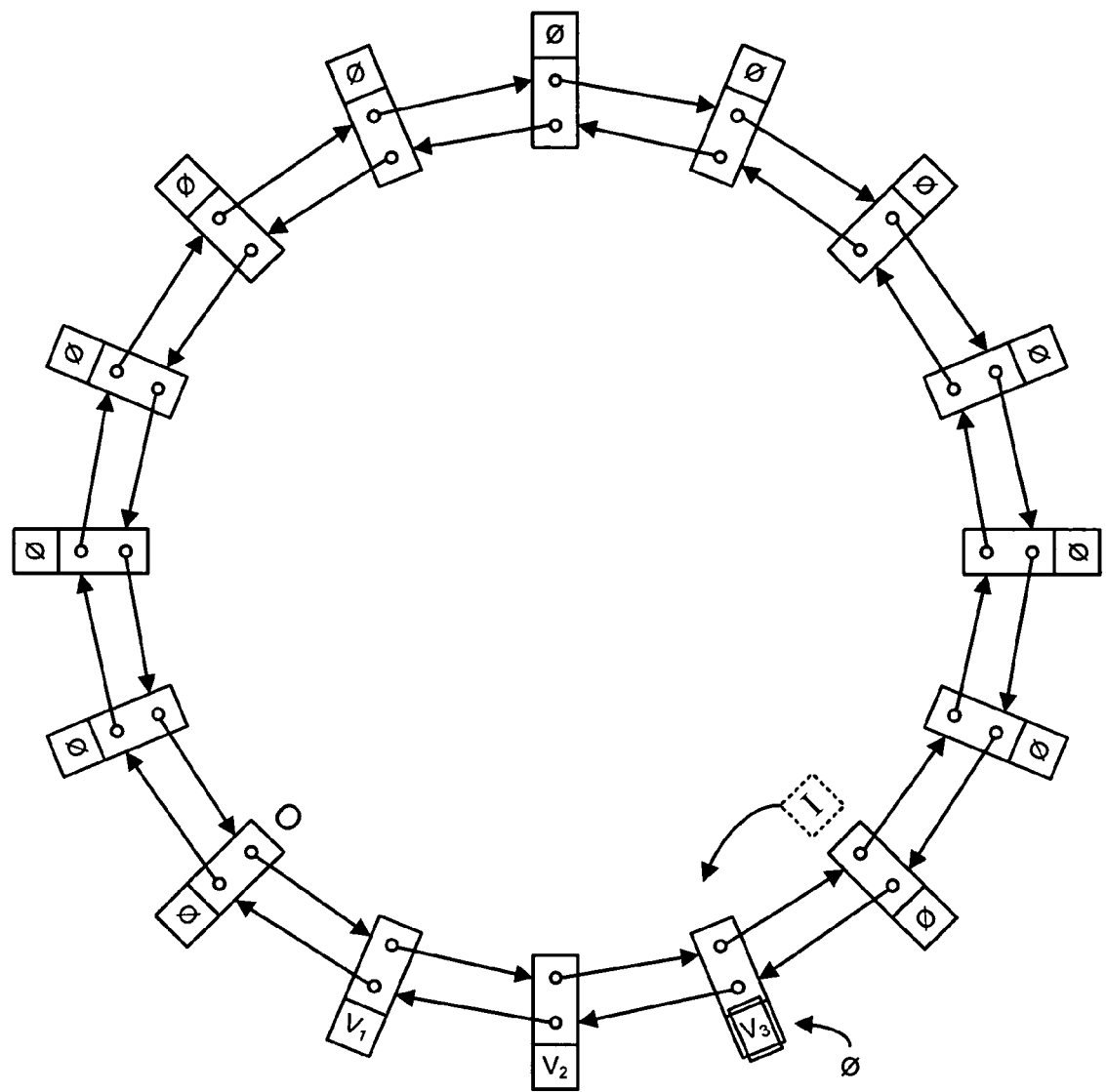
FIG. 4 illustrates a HatRing set up for an inner pop operation in accordance with an embodiment of the present invention.

Popping values from either the inner or outer "end" works very much like the HatTrick; a Double Compare-And-Swap (DCAS) is set up to lock both the "hat" from the chosen end and the value of the cell closest to the hat in the active popping direction (that would be following the outer pointer in the case of an inner pop). See FIG. 4 for an illustration of the pop setup.

If the value in that cell is a null, then the deque was at least momentarily empty. If a DCAS confirms that it is empty, the pop passes this message back. Note that this test is better than testing whether the other hat is on the node to be popped since it does not create a memory reference to the other hat, which could impede pushes and pops at the other end of the deque.

Figure 5:
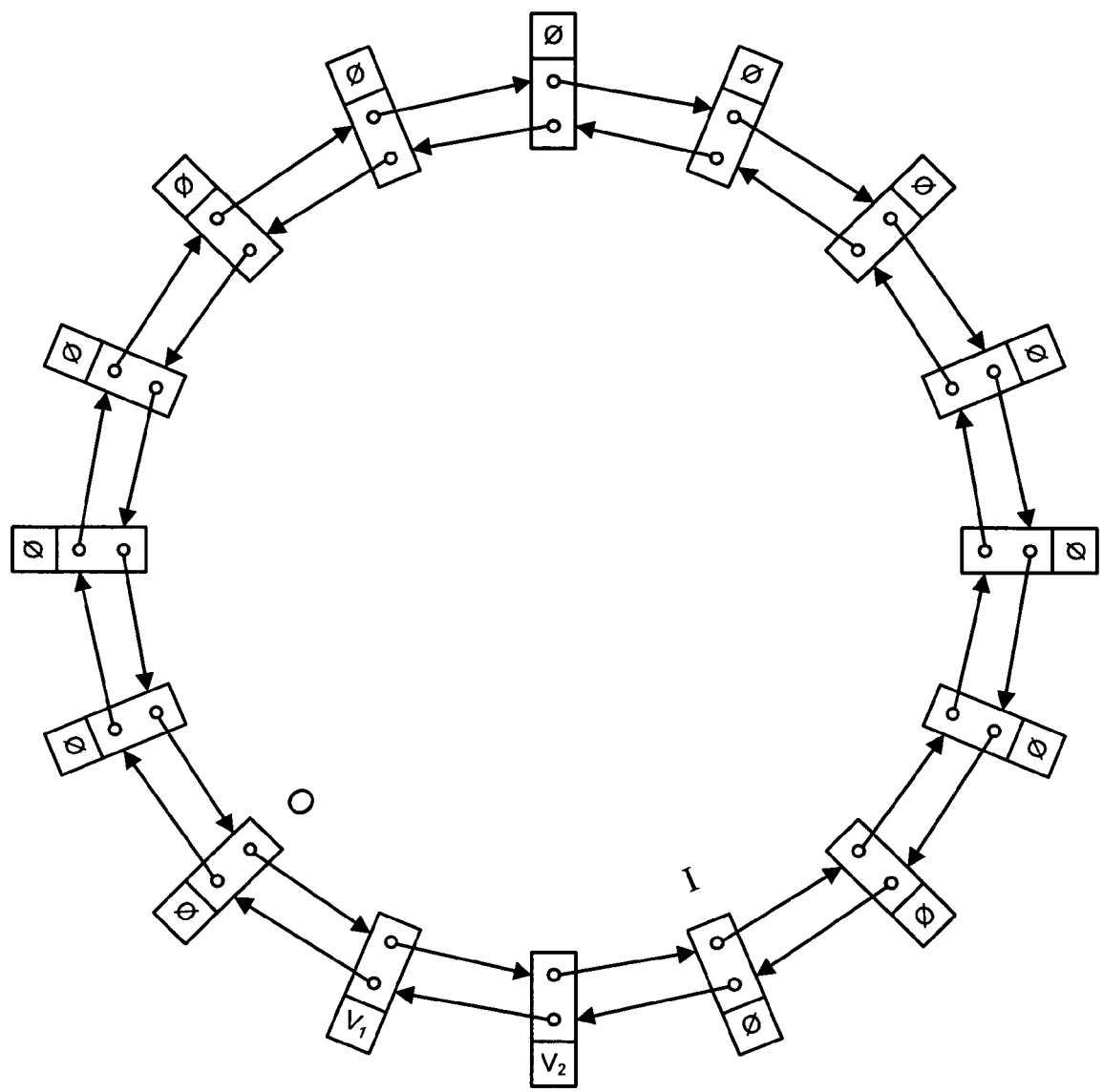
FIG. 5 illustrates a HatRing after an inner pop operation has succeeded in accordance with an embodiment of the present invention.

If the value is not null and not a special marker, the DCAS is attempted. If it fails the whole effort loops. If the DCAS succeeds, the value is returned as a success. See FIG. 5 for an illustration of the resultant state from a successful pop action. Outer pops work in a symmetric manner.

Warring Pops

Figure 6:
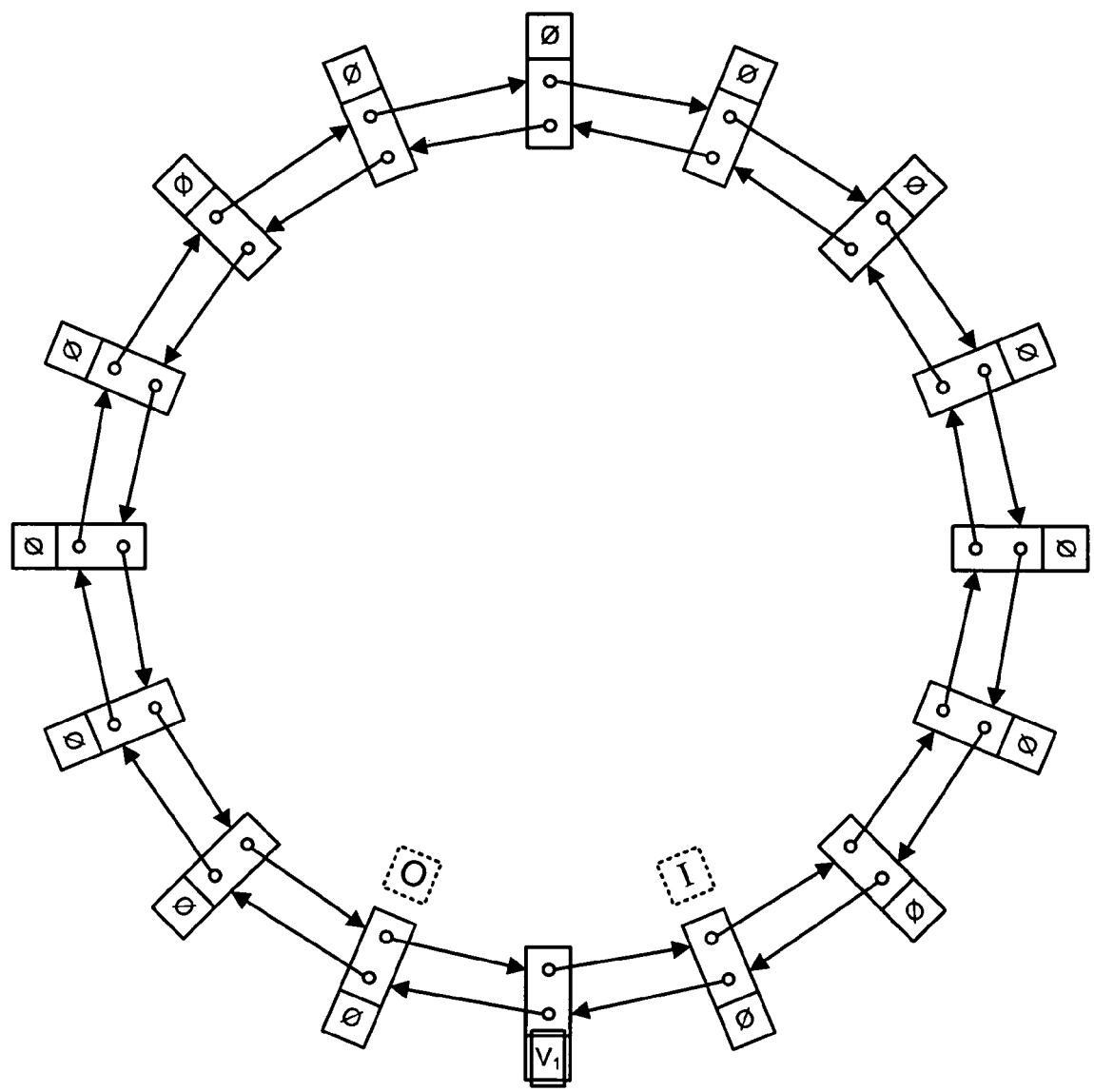
FIG. 6 illustrates a HatRing with warring pop operations in accordance with an embodiment of the present invention.

Note that both ends of the deque may simultaneously attempt to pop the last value in the deque. FIG. 6 illustrates the two DCAS operations that would occur. Since the winning DCAS will reset the popped value ($V_1$ in FIG. 6) to a null value, only one DCAS can succeed. The failing one will loop and then detect the empty deque during its setup phase.

Pushing a Value onto the Deque

Figure 7:
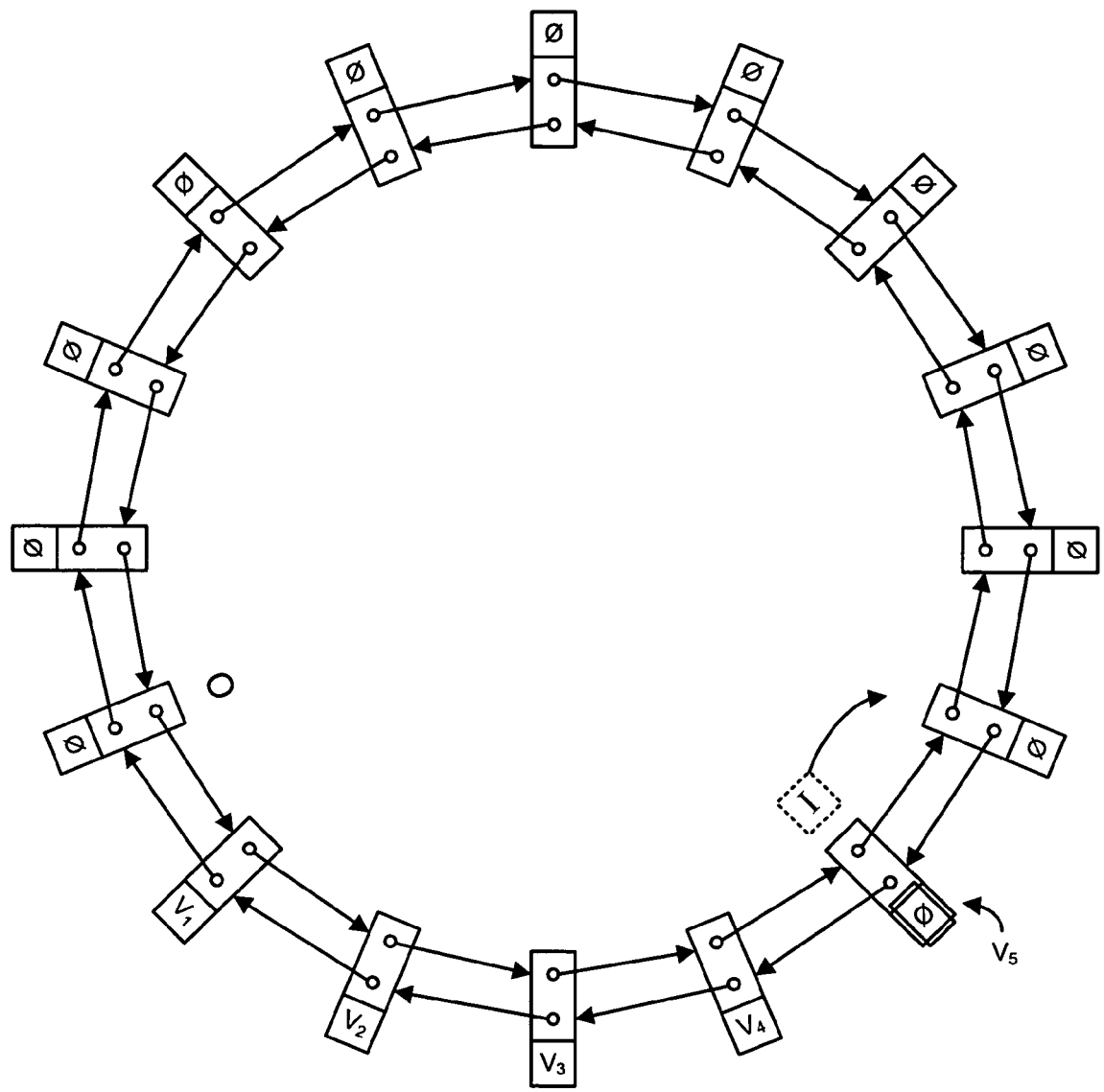
FIG. 7 illustrates a HatRing set up for an inner push operation in accordance with an embodiment of the present invention.

The pushing of a new value works very much like in HatTrick, with only a check for special values "under the hat" before doing the normal setup. Assuming all is normal (see later discussion of special values), the DCAS is set up to move the hat along the "same name" pointer chain (that is, an inner push prepares to move the inner hat onto the node pointed to by the inner pointer of the Inner sentinel node), and the value cell of the sentinel node is predicted to be null. See FIG. 7 for an illustration of the DCAS setup for pushing a value $V_5$ onto the Inner end of the deque.

Figure 8:
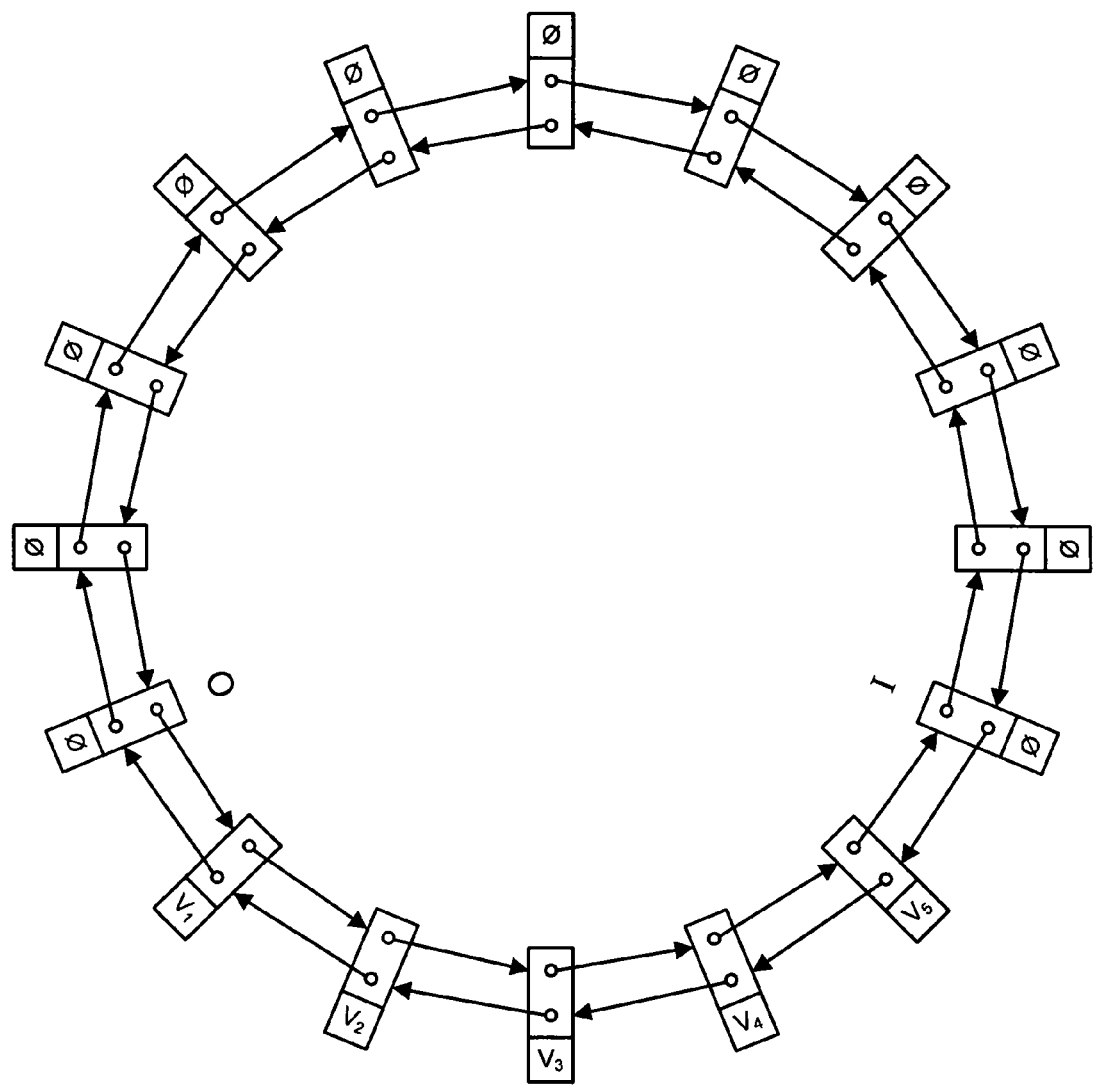
FIG. 8 illustrates a HatRing after an inner push operation succeeds in accordance with an embodiment of the present invention.

The DCAS is then attempted. If the DCAS succeeds, the value has been successfully pushed and the push may return. This is the common case and requires the minimum use of expensive instructions and no allocation or deallocation of storage. FIG. 8 shows the changes in the structure which result from the DCAS putting a value ($V_5$ in this case) onto the inner end of the deque.

Push Failures

The push DCAS fails if the hat was moved by another process and left in different location (perhaps a push or pop from the same end, although a push and a pop from the same end would return the hat to the predicted location and allow a successful DCAS) or if the value cell to be filled with the new value (the one in the sentinel node) no longer has a null in it. In the failed DCAS path, if a hat move is detected the problem is handled by looping the setup and repeating the DCAS.

If the push DCAS failed due to the value in the current sentinel being an "S", "E", or "W", then we have run into ring structure manipulation in progress and must be prepared to assist its completion. These moves are either completion of splicing in more nodes or a related task of removing the hat from a "spur". Both are described later; after doing either of these we retry the push.

A Full Ring

If the value in the current sentinel is some other non-null value, we have just discovered that the ring is full—that is, the hats have crossed over one another in the "backside" of the ring and are now sitting on data values logically at the head of the other end of the deque. We will have to initiate adding storage, and then retry the push.

Figure 9:
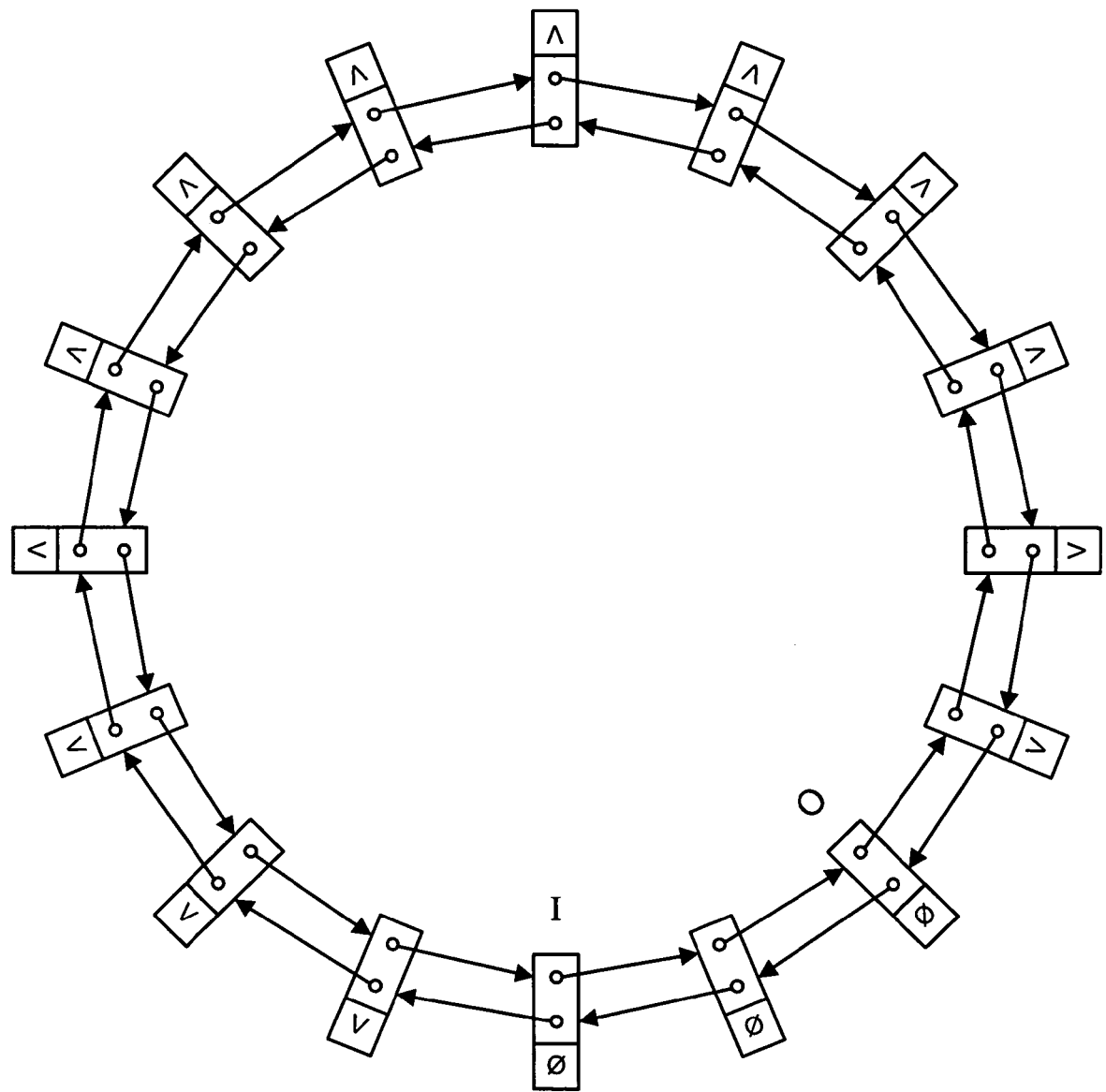
FIG. 9 illustrates a HatRing which is full except for three nodes in accordance with an embodiment of the present invention.

To visualize the full-ring situation, first examine the related situations: FIG. 9 shows a ring with all but three of the linked cells full of active data. The hats are very close to one another in the same-name direction. Only the two sentinels and one spare node remain inactive.

Figure 10:
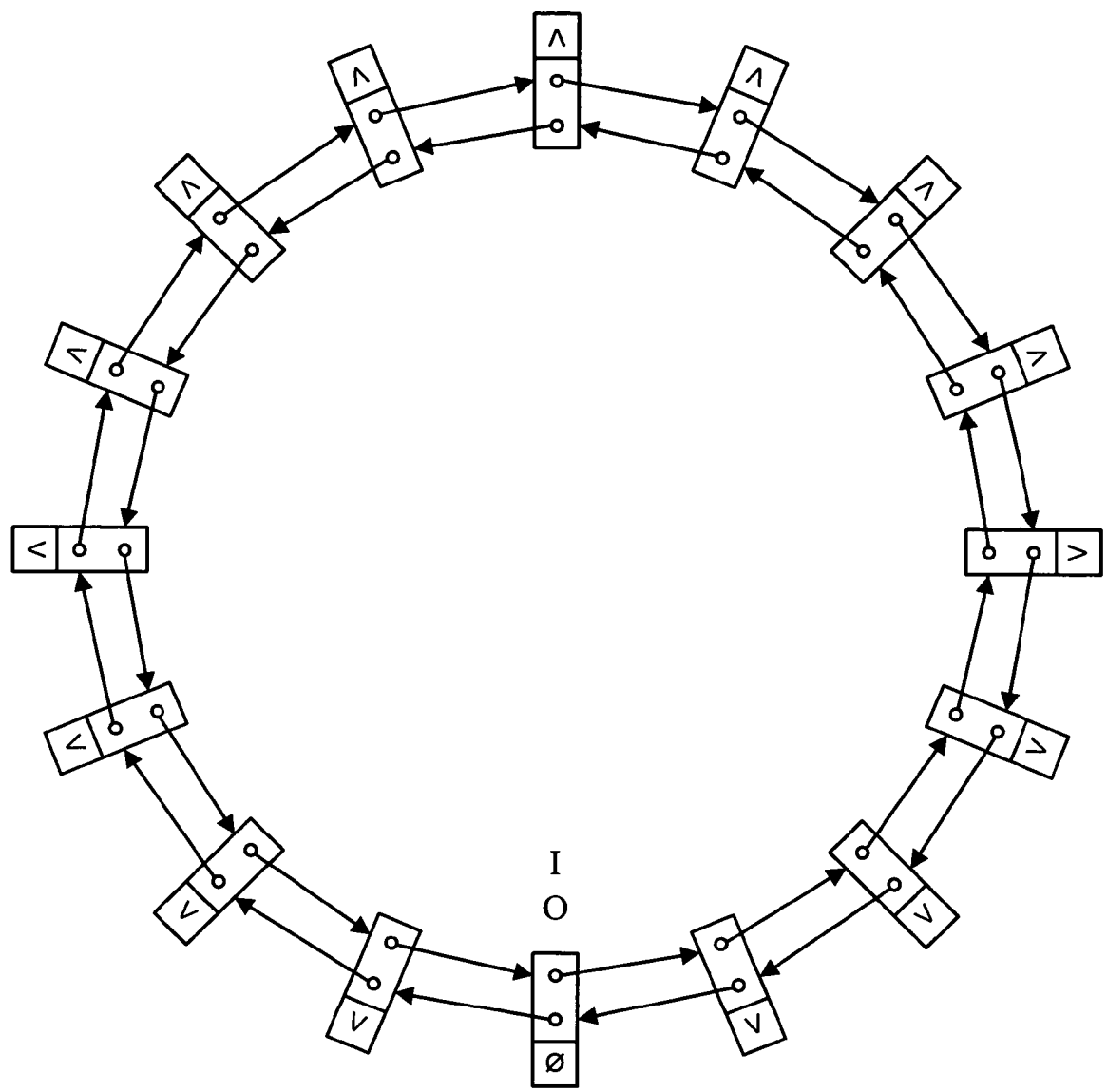
FIG. 10 illustrates a HatRing which is almost full wherein the hats are stacked in accordance with an embodiment of the present invention.

After a net of two more pushes from either end we have the situation shown in FIG. 10 where both hats are "on" the same node, the only inactive node remaining in the ring structure. At this point either end can do only one more push before the ring is full.

Figure 11:
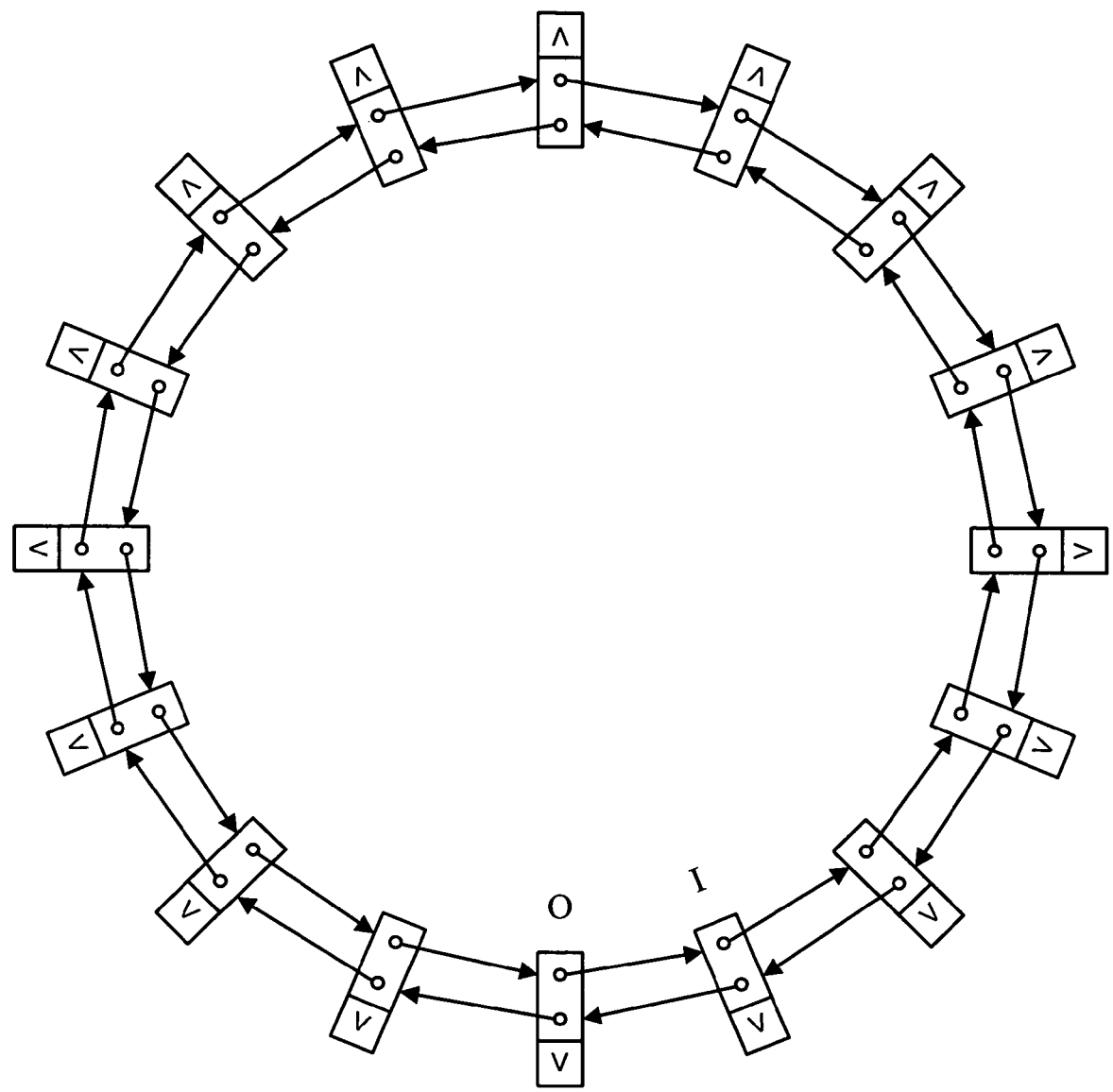
FIG. 11 illustrates a full HatRing with hats that are crossed in accordance with an embodiment of the present invention.
Figure 12:
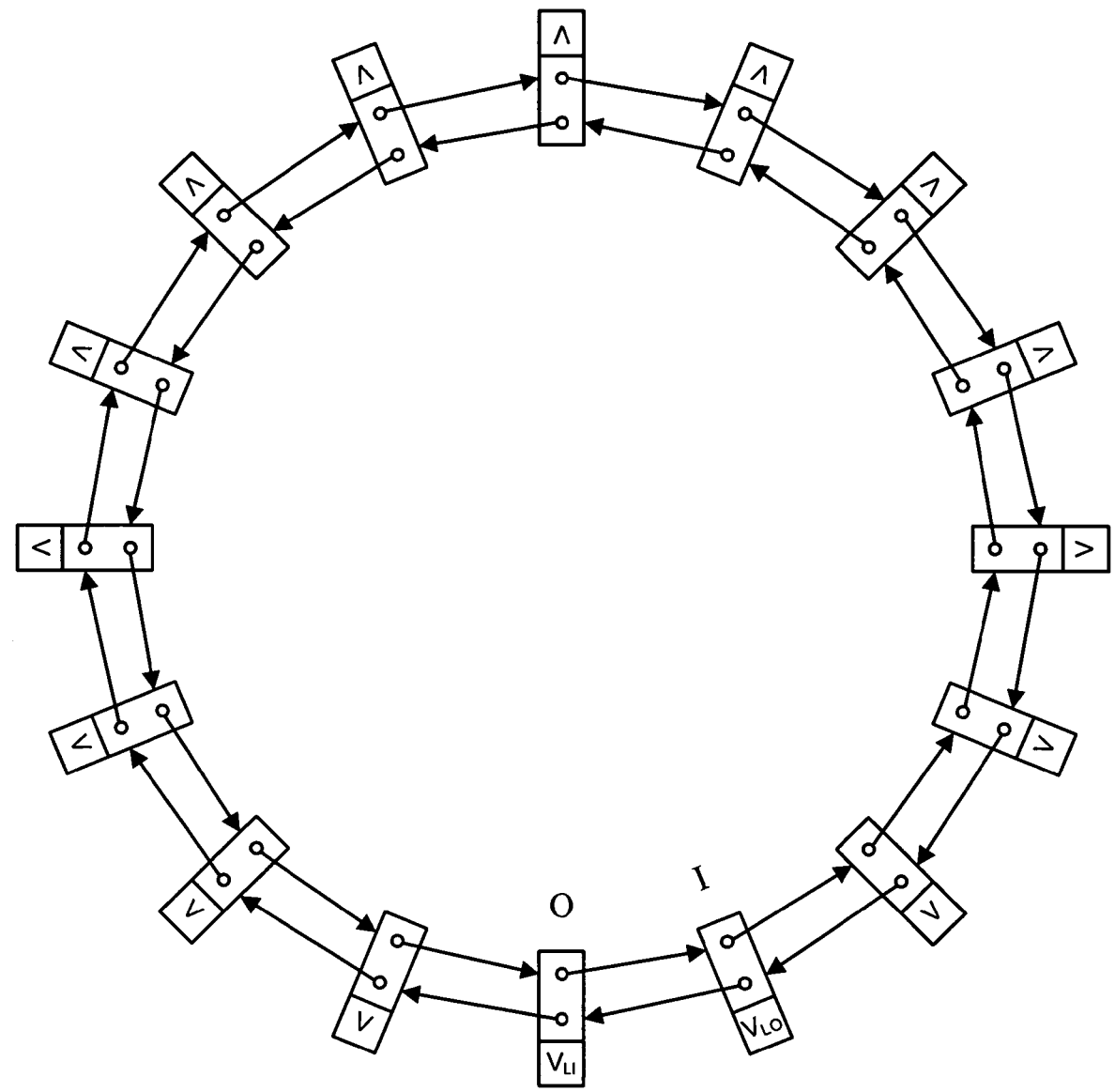
FIG. 12 illustrates a full HatRing wherein an inner pop will succeed in accordance with an embodiment of the present invention.
Figure 13:
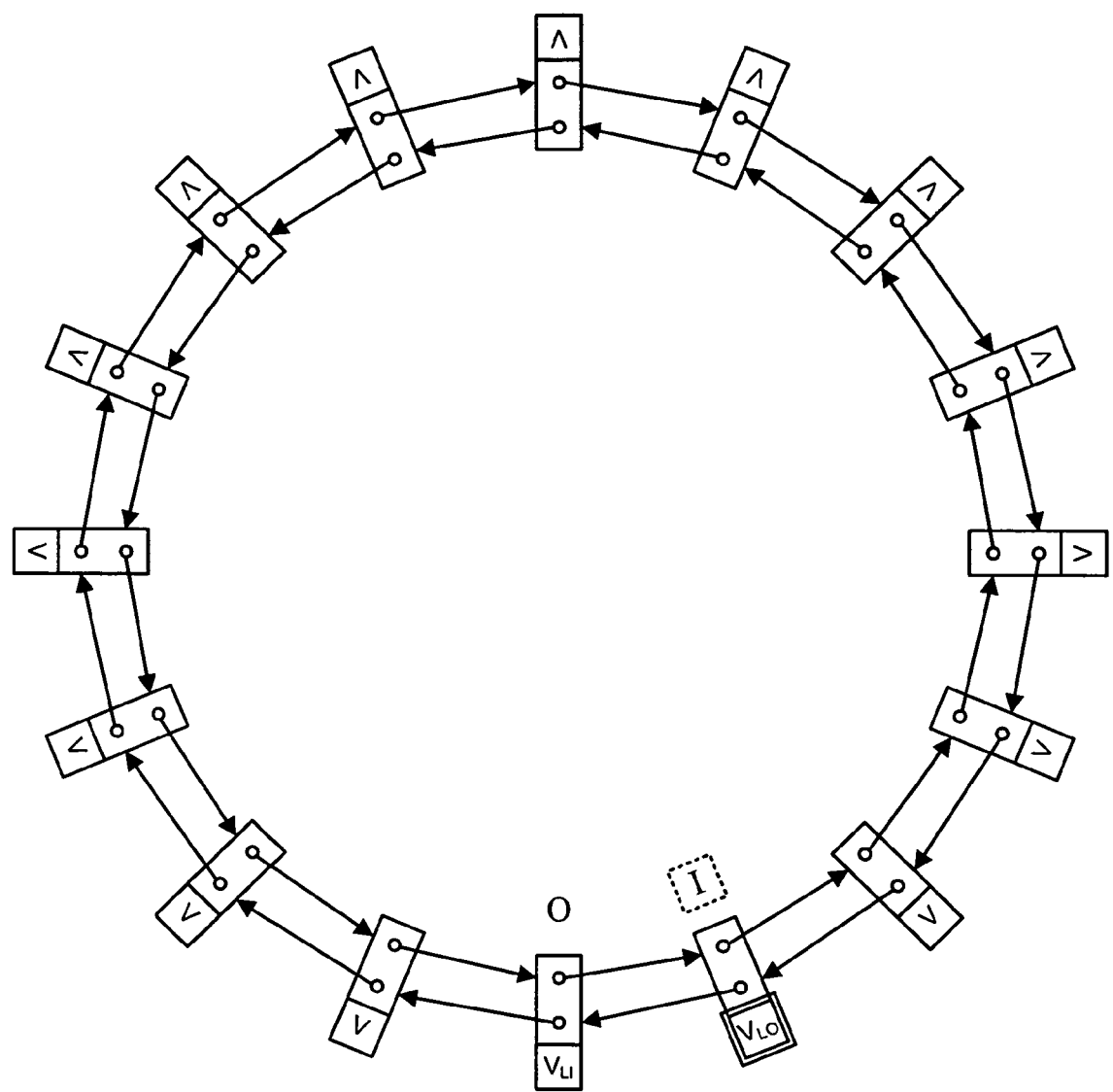
FIG. 13 illustrates a full HatRing wherein an inner push will fail in accordance with an embodiment of the present invention.

Finally, FIG. 11 shows the ring completely full and the hats each sitting atop the cell that is the top of the opposite end of the deque. In this situation, a pop from either end neatly untangles the situation (See FIG. 12) but a push onto either end will fail due to a normal value existing in the value cell of the pushing hat—a contradiction of the DCAS prediction of a null value. In FIG. 13 we see that an inner push would flunk its DCAS because $V_{LO}$ (the last item pushed on the other end) is in the value cell of the inner hat. In this case we see the DCAS boxed value cell (preparing for the DCAS) has $V_{LO}$ rather than null in it.

Resizing the Ring

Since our push discussion has "run out of space", it is time to explain changing the size of the ring. Ideally, we would notice that the ring was getting "pretty full" and initiate an operation that would grow it while preserving the existing data in their current nodes, but detecting an "almost full" condition and resolving it is too hard in a fully concurrent lock-free domain.

We can always detect a full ring though, as described in the push section. When the ring is full and a push is attempted we obviously need to add some more linked elements into the structure, and an analogous need to remove the spare elements from a ring that has become too big can also arise. The common actions of pushing and popping values do not usually require a change in the ring size, so we take care in implementing resizing to avoid interfering with the smooth operation of these more common actions. Both growing and shrinking share a common mechanism for resizing in HatRing.

Symmetry of Growing and Shrinking

In the HatRing deque, both growing and shrinking the ring is done by replacing all of the inactive region by logically cutting it out and splicing in a more appropriately sized replacement segment. In shrinking actions, the replacement contains very few nodes (exactly how many can be chosen by the user to balance wasted storage against leaving room for a few pushes before a grow operation is needed; a minimum ring size must be added for shrinks in case it becomes the new ring as detailed below). In the usual case of shrinking the ring, the two target nodes "under the hats" are spliced out and the smaller ring replaces them.

In growing operations, two adjacent nodes are spliced out and a larger loop is spliced in their place. In both cases we must splice out a node at each end of the "break" because a push operation in another thread may have already decided to follow a link from the last valid node onto the "memorized" next one. If we did not remove it, this could allow some thread(s) running after the splice but with operand addresses computed before the splice to skip past the new loop of nodes, scrambling the data order of the ring.

Growing the Ring

A complication that arises from treating shrinking and growing as just two different instances of the basic size change operation is that when the ring is discovered to be full, there are no spare nodes to mark specially to indicate they are logically cut out and to then replace with a larger loop of storage. All the ring slots are full, so a different move is needed.

Copying Out Data

Figure 14:
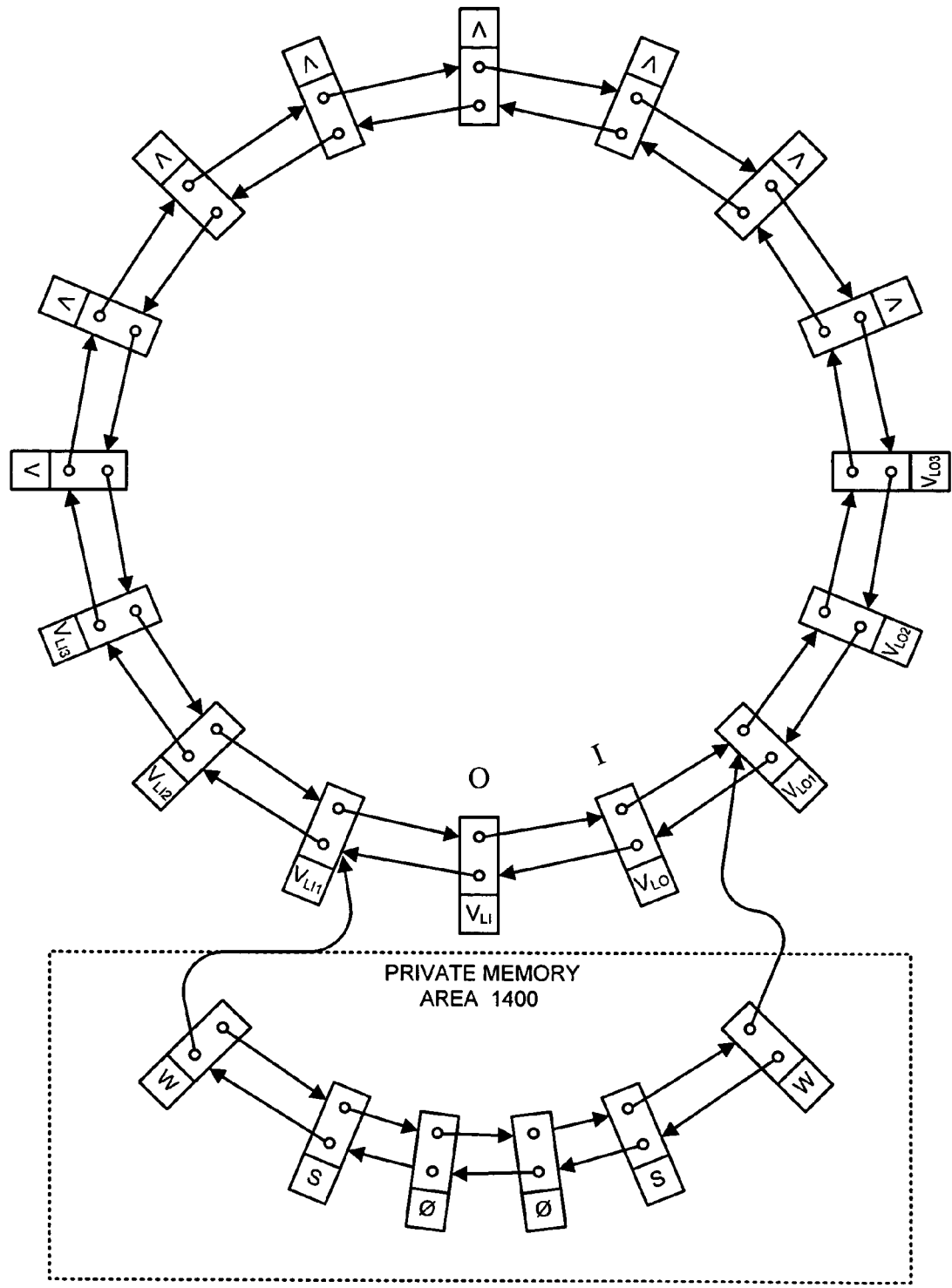
FIG. 14 illustrates the splicing of a bubble onto a HatRing in accordance with an embodiment of the present invention.

We resolve this as shown in FIG. 14 by marking the new storage with a special value that indicates that data must be copied after the new bubble is added to the main one. We cannot just copy the data while the new bubble is still in private storage because other concurrent threads may change the "real" values in the main ring without providing us any way of detecting or blocking that change. When data must be copied after the expansion, we place a special value (called "W") in the value cells of the end-points of the new bubble of storage. When the ring is not full, we can use empty main-ring nodes as the "stubs" for the splice, so we do not mark copying flags in the nodes.

New Bubble is Ready

In all cases, the new bubble is built of empty nodes, doubly linked just as in the main ring. The end pointers of the new bubble are pointed in the to the main ring, forming a splice visible from the new storage that points to the nodes just "before" the ones to be sacrificed as stubs.

The last node on each end is marked with the copy flag ("W") if the main ring is full, and the node next to it on each end (or the end node when the main ring is believed to be not full) is filled with a splice-in-progress marker value ("S"). The new bubble is still entirely in private memory of the thread that has decided to attempt a splice (see FIG. 14).

Hats Slammed

Figure 15:
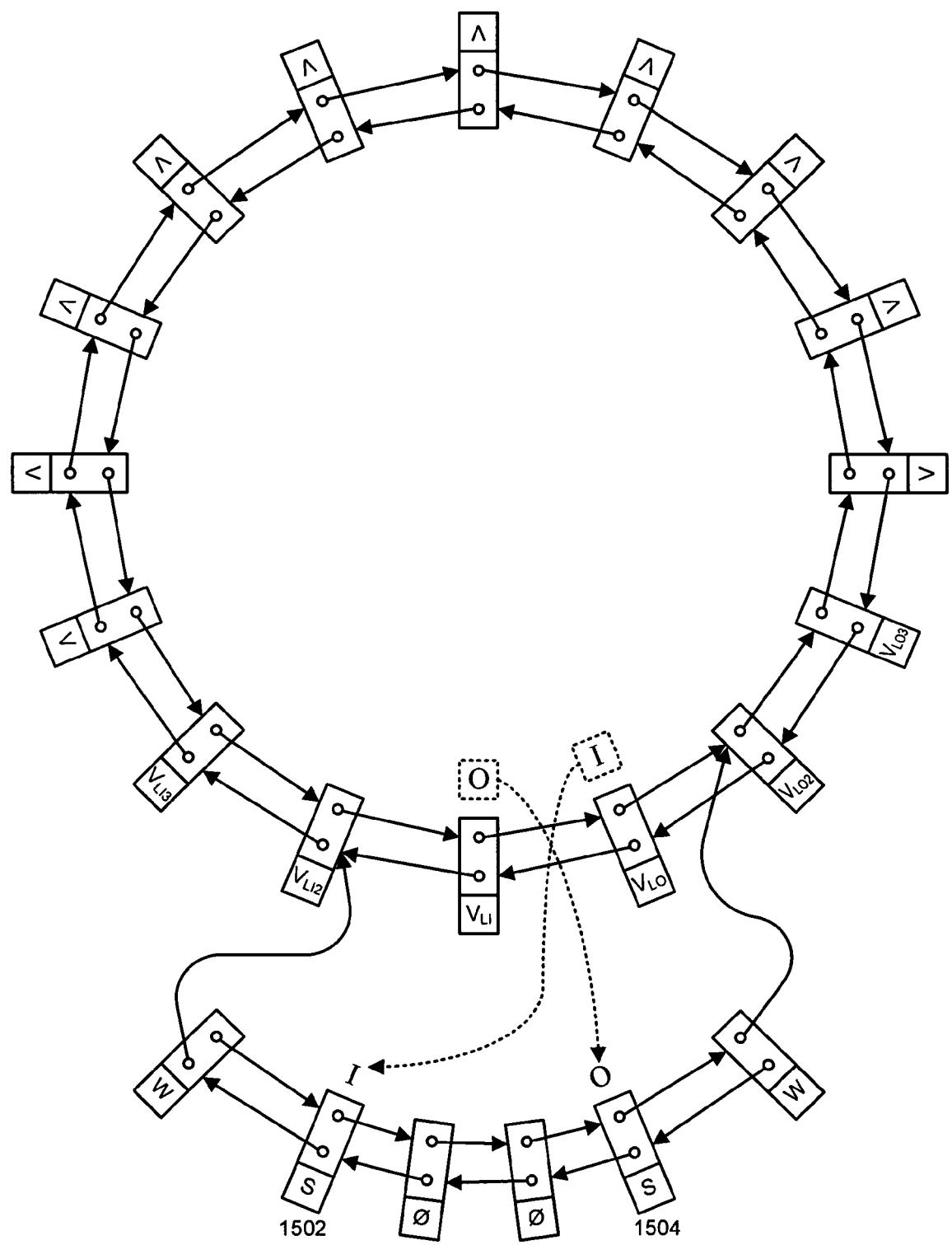
FIG. 15 illustrates how hats are "slammed" onto a bubble in accordance with an embodiment of the present invention.

Once the new storage is pointing to the old ring and filled with the right markers, we use a DCAS to "slam" both hats from where they were to instead point to the "splice in progress" marked nodes of the new bubble. If the hats are both pointing to the nodes for which the new bubble was built, the DCAS will succeed; the hats may have changed and "changed back" while the new bubble was being constructed, but so long as they are where they were, the move is correct and the DCAS will succeed (see FIG. 15). Note that this move "uncrosses" the hats, but maintains the data order represented when they were crossed over. Multiple threads may have started to grow the full ring, but only the one that successfully moves the hats onto its newly allocated memory will change the global structure. The rest will fail in trying to move the hats, discover the change, and release their private allocated memory. The nodes that held the hats at the moment the new storage is added are subsequently spliced out of the ring, so even extremely slow threads cannot be fooled by finding both hats restored to these nodes at some future time.

Hats on a Half-Linked Bubble

Once the hats are on the new bubble, any thread can complete the splice operation. The hats are on the new storage, and both are "sitting on" nodes that are marked with the "S" flag value. The basic drill in this case is to copy values (if needed), insert the exclusion markers in the spurs, fix the main ring structure so that the "foot" nodes as the last one retained in the original structure will point to the new bubble, and then replace the "splice in progress" markers with ordinary nulls. Any thread finding a special value "under a hat" can complete this cleanup without interfering with other threads doing the same thing.

The "Spurred Foot" Complication

Before we can do this, we must check whether a splice by another thread has caused either or both of the bubble-to-main pointers that were set up before the splice to be pointing to "spur" nodes, due to a concurrent splicing operation.

If either of the "foot" pointers from the new bubble point to a cell with the excluded value ("E") in it, this means a different thread completed a splice and in doing so cut out (made a "spur" of) the node, and it did so after "our" splice chose where to point into the main ring.

Unspurring a Foot

If either node pointed to by "end pointer" of a new bubble ("foot" node) has an "E" special value, it is such a spur and is no longer a viable candidate for splicing in the new bubble. But like all spurs, it retains its pointer back into the main ring, and the node found by following that pointer has an updated pointer "outward" to the node that has logically replaced the excluded spur. If either "foot" node is found to have such a value, the pointer from the bubble end is updated (with a CAS predicting the old "E" node value) to point instead to the replacement node. No looping is needed; if the CAS fails it is because another thread made the change. When the "feet" are known to not be spurs, we can safely proceed.

Copying the Values

If the value in either end node of the new bubble is a copy flag ("W"), we must move the values that in the sacrificial nodes of the old ring into the spaces reserved by these special markers.

A Very Special Case

At the time of finishing a splice, we may discover that the nodes marked to be copied are "empty", and that implies that the main ring itself is empty. This case is handled by using a DCAS to try to splice the nodes next to the ends of the new bubble to each other; if it succeeds then the old ring is released for garbage collection as soon as any threads referencing it finish. The "W" values can be ignored and garbage collected, the "S" values in the new ring are replaced by nulls and the size change is complete.

Moving the Values

Figure 18:
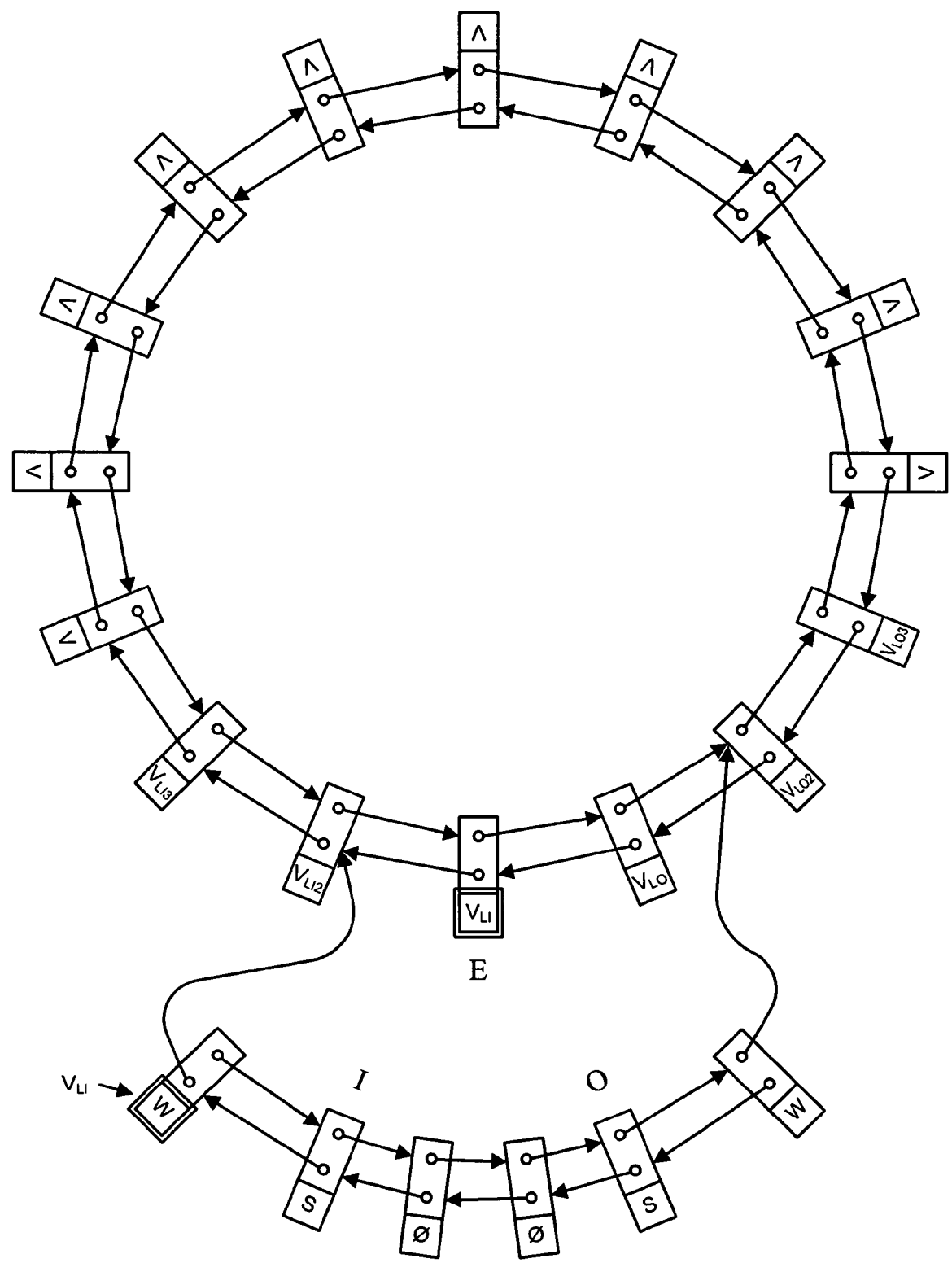
FIG. 18 illustrates moving a value to a bubble in accordance with an embodiment of the present invention.

But usually the old ring still matters, and we can use a pair of DCAS operations to move the values. Each DCAS tries once to replace the "W" in one end of the bubble with the old value in the node that is being "spurred", and simultaneously replace the value in the sacrificial node with the "E" special mark meaning it is a spur node (see FIG. 18). Each DCAS is just tried once; since these values can only be changed in this pattern, a failure means another thread did the work.

Figure 19:
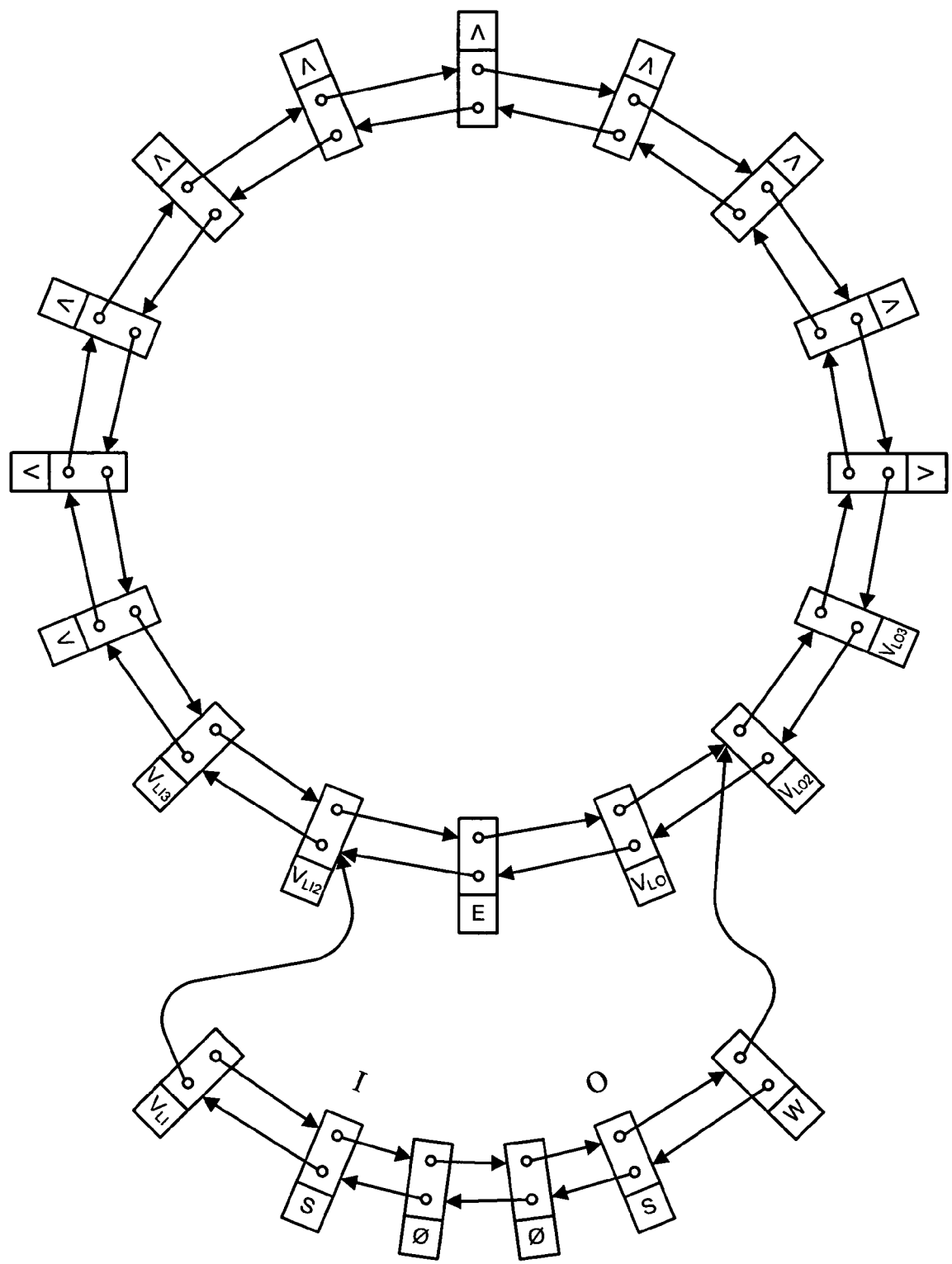
FIG. 19 illustrates the result of moving a value to a bubble in accordance with an embodiment of the present invention.
Figure 20:
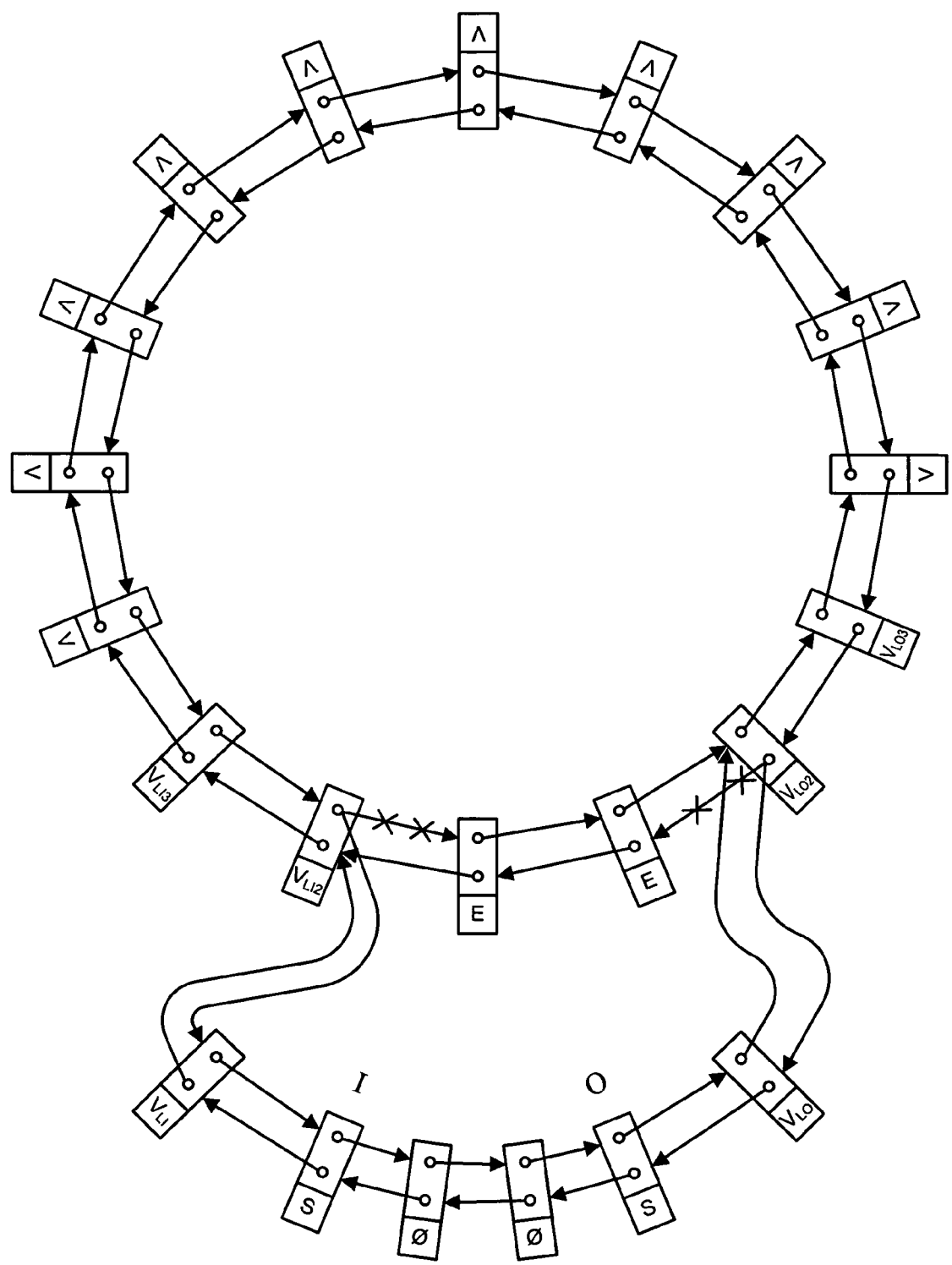
FIG. 20 illustrates how old ring pointers are fixed in accordance with an embodiment of the present invention.
Figure 21:
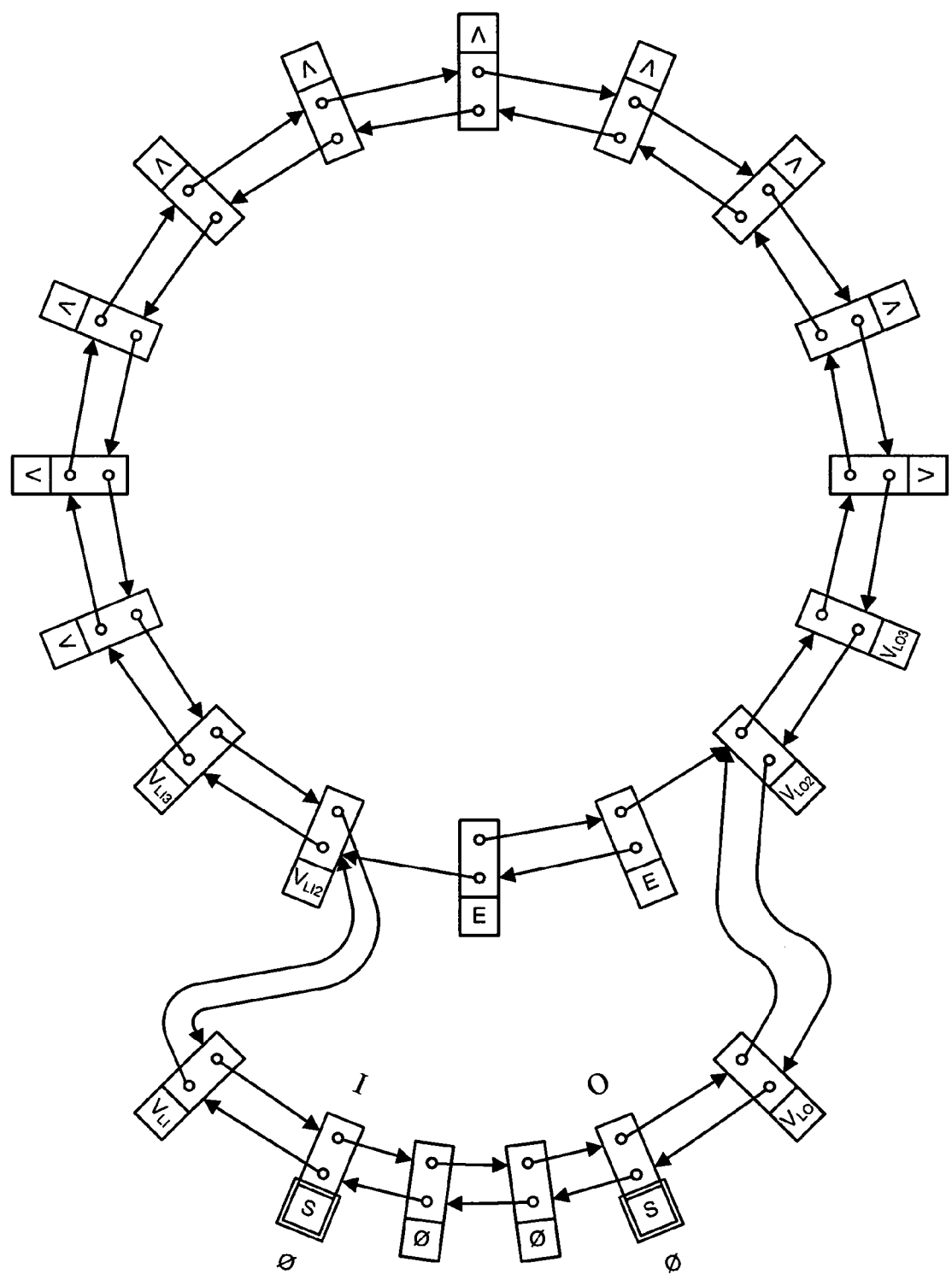
FIG. 21 illustrates removing S-marks in accordance with an embodiment of the present invention.

FIG. 19 shows the result after one of the value moves and stub markings. A similar one does the outer end. Note that the ends are always done in a fixed order, regardless of which end was being pushed when the ring was determined to require resizing. Once the sacrificial nodes are marked and their values safely copied, the "outward" pointers of the "foot" nodes in the main ring are moved with a DCAS (or two compare-and-swap operations—normal write does not suffice) to point to the respective ends of the new bubble (see FIG. 20). The new bubble is now fully connected, replacing the spurred nodes of the old ring. The final step of using DCAS to replace both "S" markers with normal null completes the cleanup (see FIG. 21).

Shrinking the Ring

Besides the need to add storage, the hatRing deque may be called upon to release the storage that is not currently active. We do this by replacing the large loop of empty storage with a smaller new loop, performing a splice very much like the grow operation. Because there are spare nodes in the ring, we can avoid the complications of copying data and just use the empty ones under each hat as the stubs for our splice. Since no nodes were needed for data, the end nodes of the new bubble carry the "S" flag values and the splice operation is a DCAS to move the outerHat to the innerEnd of the new storage and the innerHat to the outerEnd of the new bubble. If this succeeds, the cleanup can be done by any thread that finds a hat "sitting on" a node marked by a splice-in-progress ("S") value.

The "Gotcha" Shrink

One special case arises when shrinking; the empty ring. Since the position of the hats relative to each other is the same in an empty ring and in a ring that is completely full, we must set up the shrinking of an empty ring as if it were completely full; there is no way to insure that during the process the ring does not get filled up and coincidentally leave the hats in the same spots occupied when it was empty.

Figure 16:
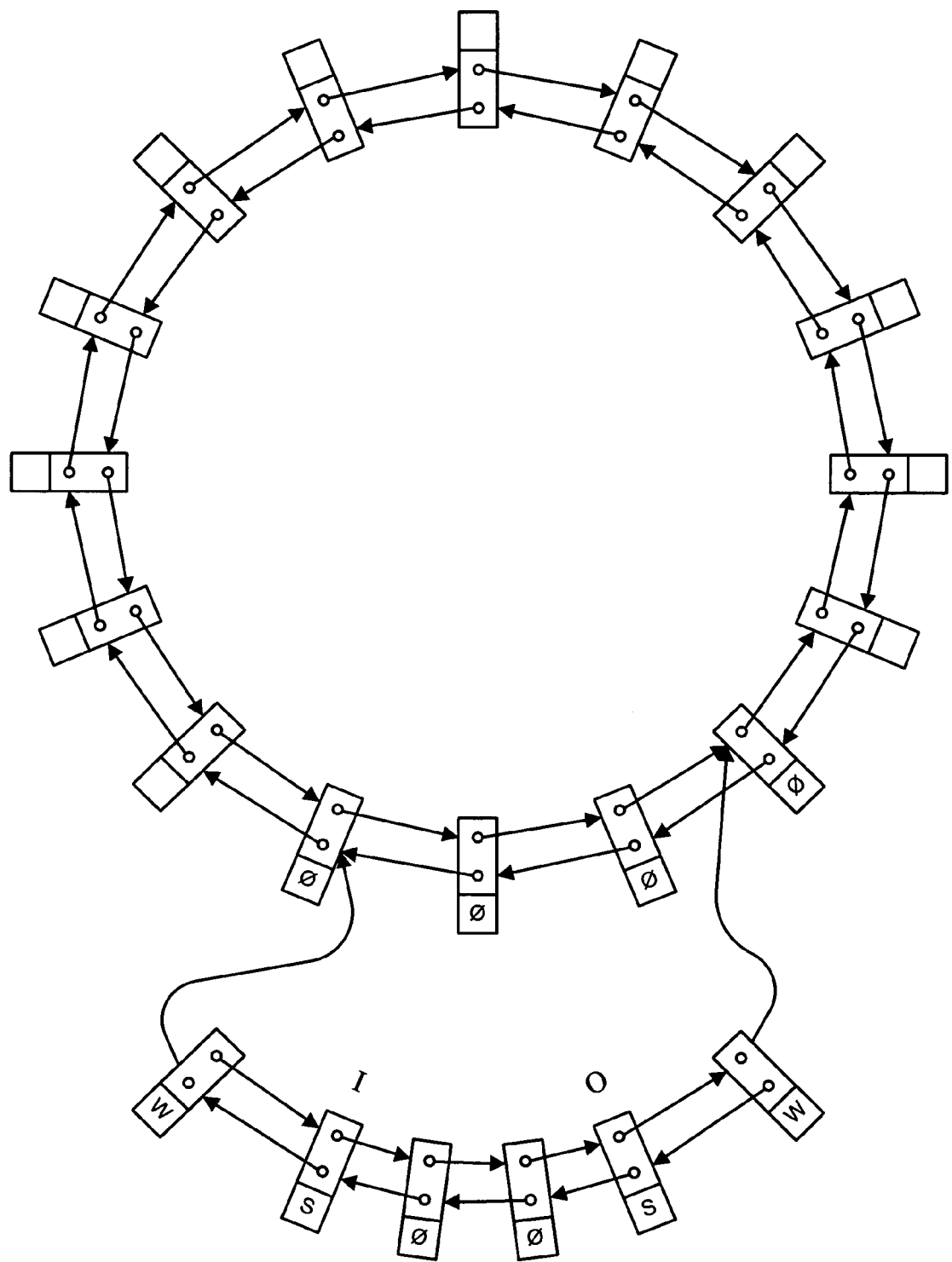
FIG. 16 illustrates a parent ring found empty in accordance with an embodiment of the present invention.
Figure 17:
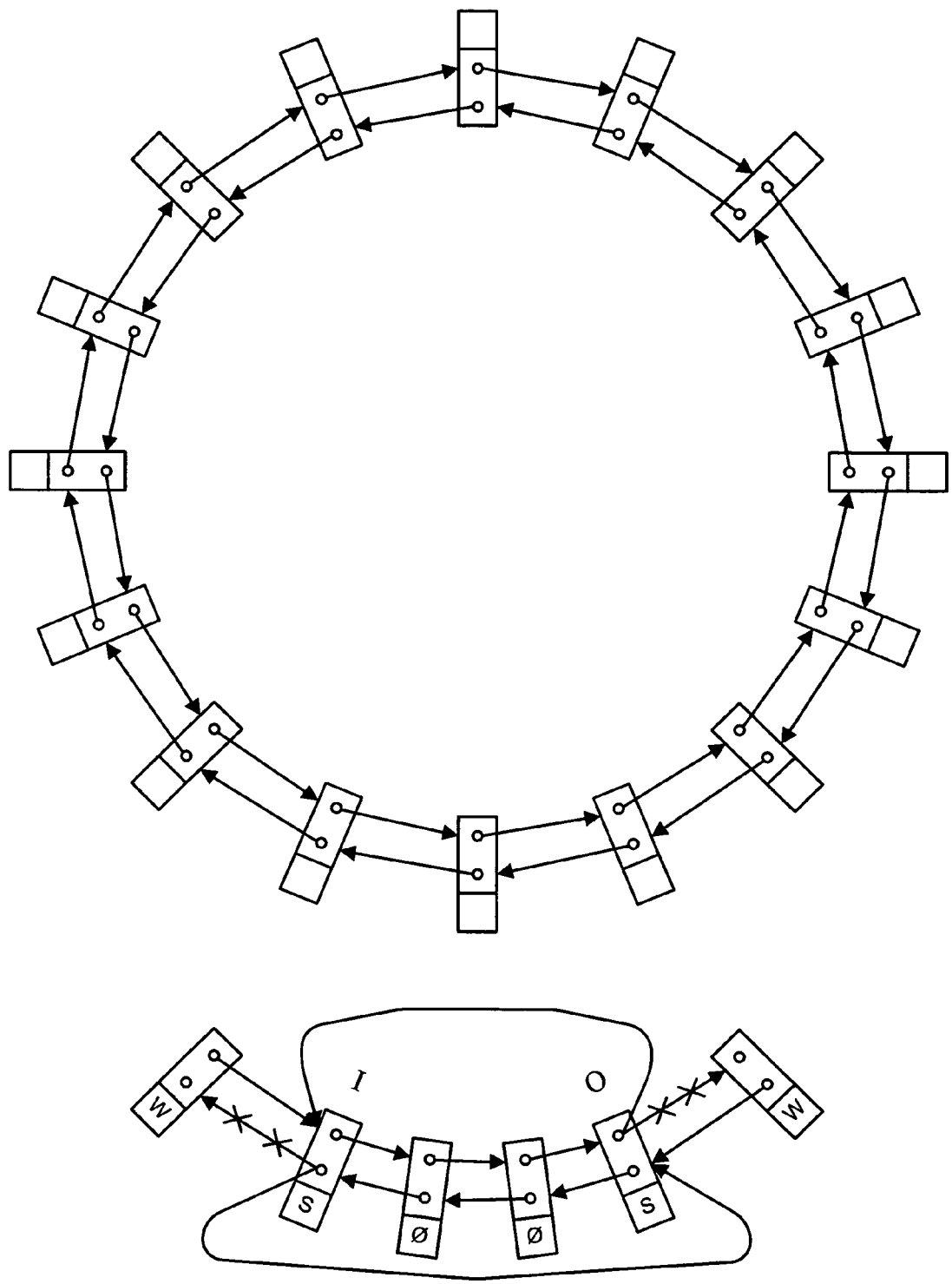
FIG. 17 illustrates a parent ring spliced out in accordance with an embodiment of the present invention.

Just to skip ahead here, if we discover that the values to be copied into the "W" nodes are actually nulls, then the ring was empty at the time the hats were slammed onto it, and it cannot gain values again until the "S" values under the hats are changed, so we can safely recognize the empty state (see FIG. 16) and move the "outward" pointers from the "S" bounded portion of the bubble to point to the other "S" nodes. At this time we can clean off the "S" values and carry on with the old ring replaced entirely (see FIG. 17).

Finishing a "Shrink" Splice

Figure 22:
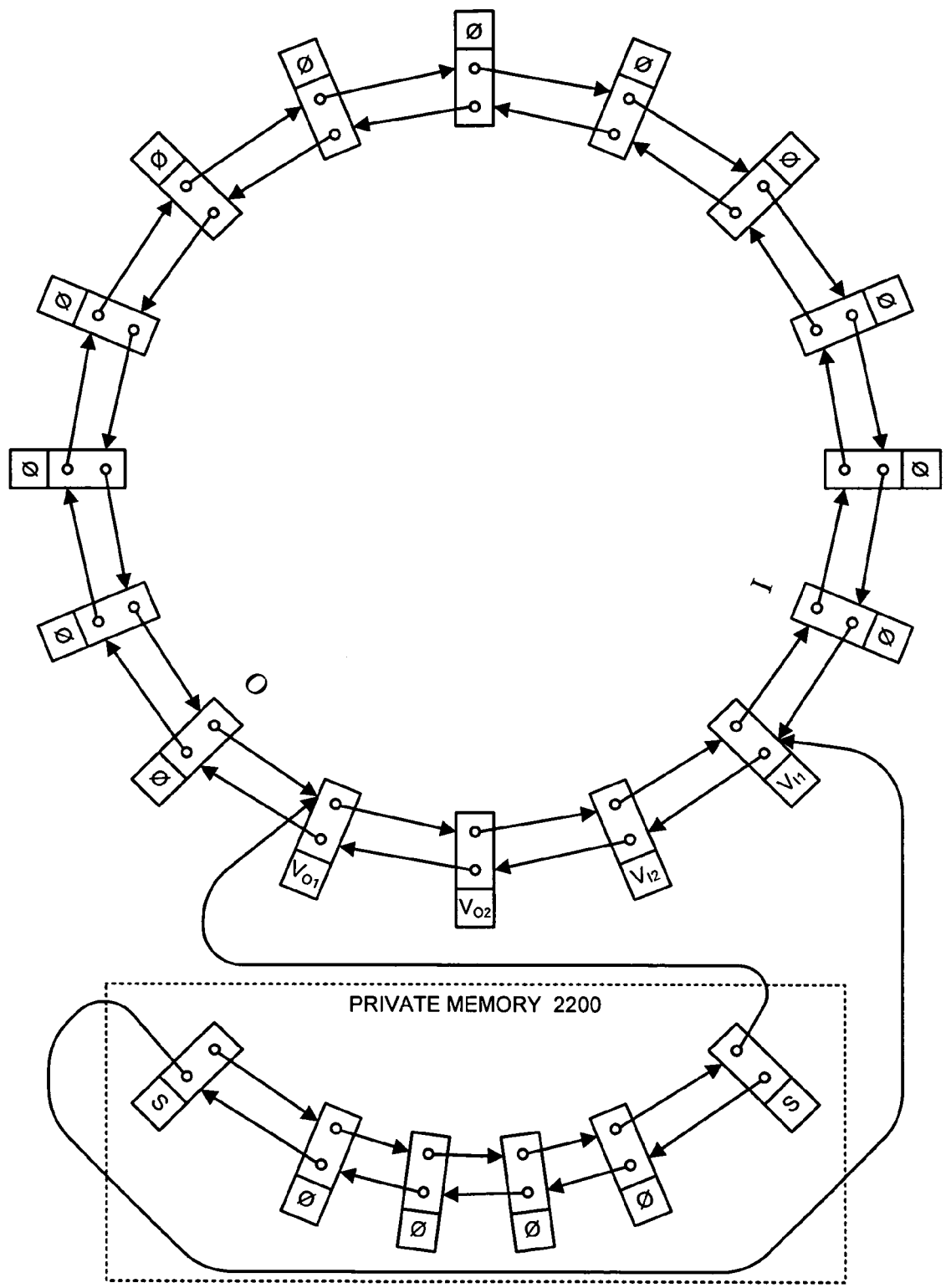
FIG. 22 illustrates a ring-shrinking operation in accordance with an embodiment of the present invention.
Figure 23:
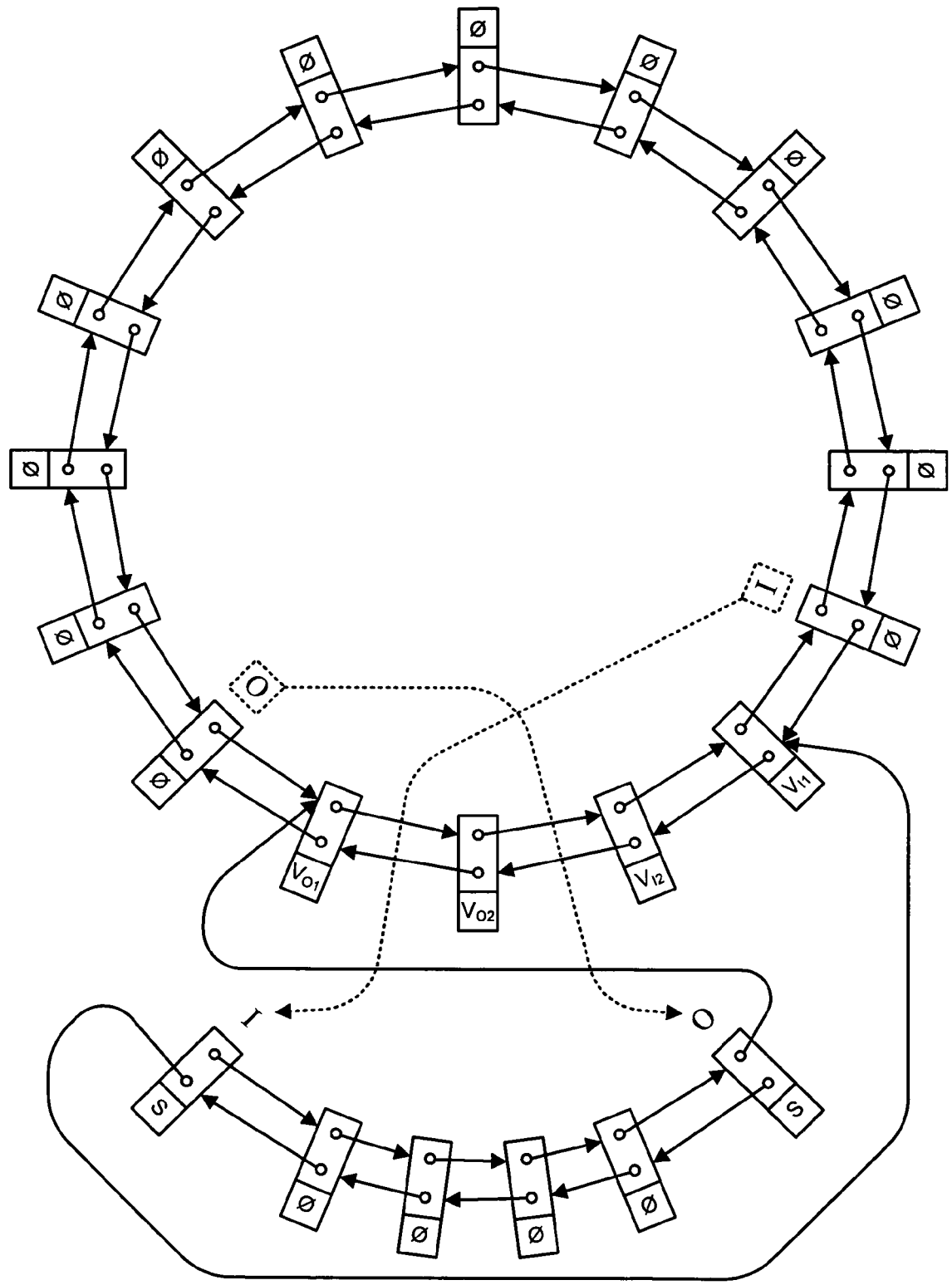
FIG. 23 illustrates how hats are slammed during a ring-shrinking operation in accordance with an embodiment of the present invention.
Figure 24:
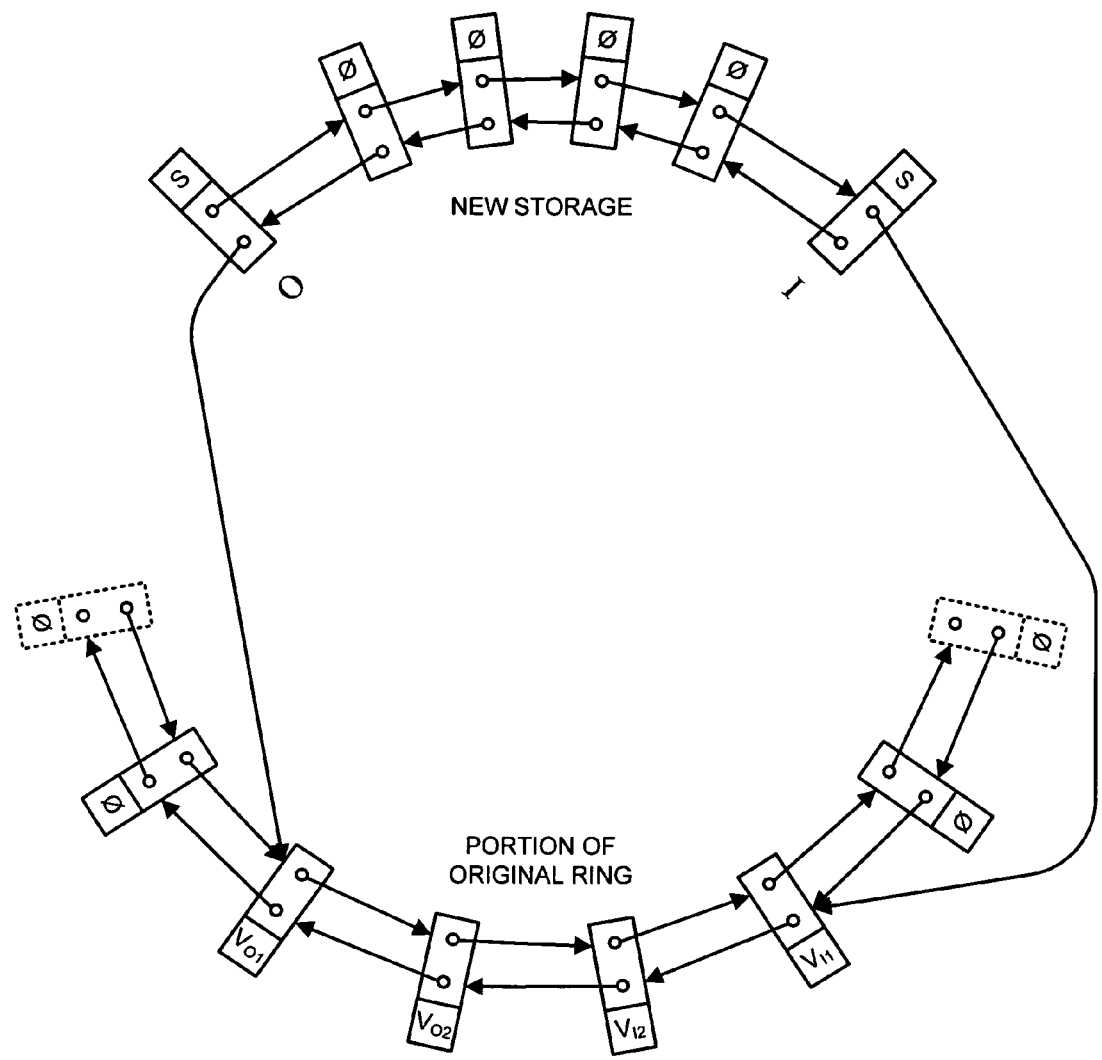
FIG. 24 illustrates a redrawn ring after the hats are slammed during a ring-shrinking operation in accordance with an embodiment of the present invention.

As hinted above, a shrink operation may be what was happening that caused a cleanup to be initiated. If so, after the check to make sure there are no "spurred feet" (and unspurring them if found), the cleanup code looks for a "W" mark in the value cell of either end node of the new bubble. If there are none, then the splice was a shrink of a partially-filled ring, and no values need be copied (see FIGS. 22 and 23). Because the bubble is oriented "backwards" from the ring, it may be hard to see the symmetry here, so we redraw the same picture with the bubble inverted in FIG. 24.

Figure 25:
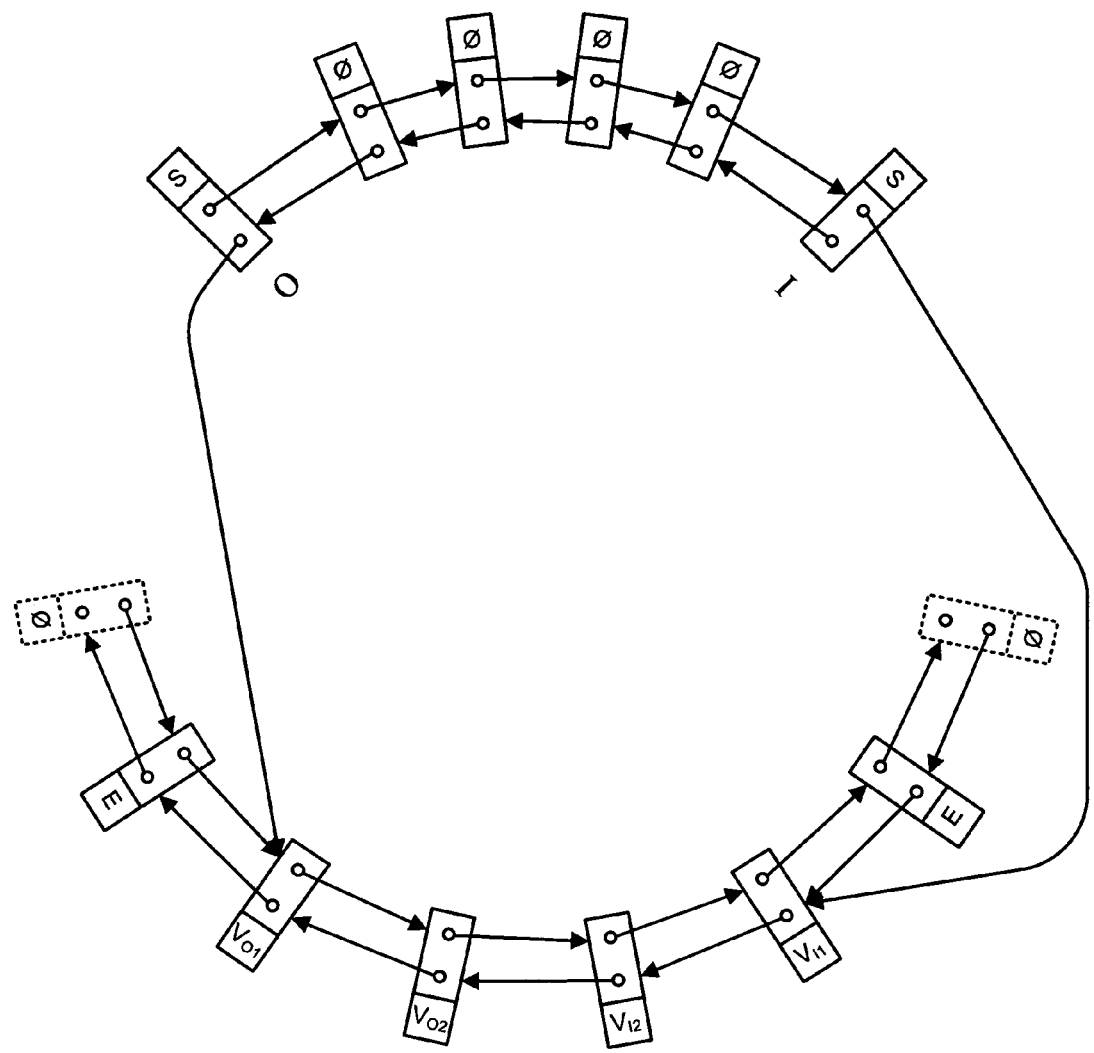
FIG. 25 illustrates replacing stubbed nulls with Es in accordance with an embodiment of the present invention.

The code must insert "E" markers in the "spur" nodes that are being sacrificed (the successor in the "outward" direction of the "feet" in the main ring). It does this with a DCAS that verifies the "S" marker in the end node of the new bubble and replaces the null value with an "E", and a similar one for the other end. These are just tried once as other threads are likely to be doing this as well (see FIG. 25).

Figure 26:
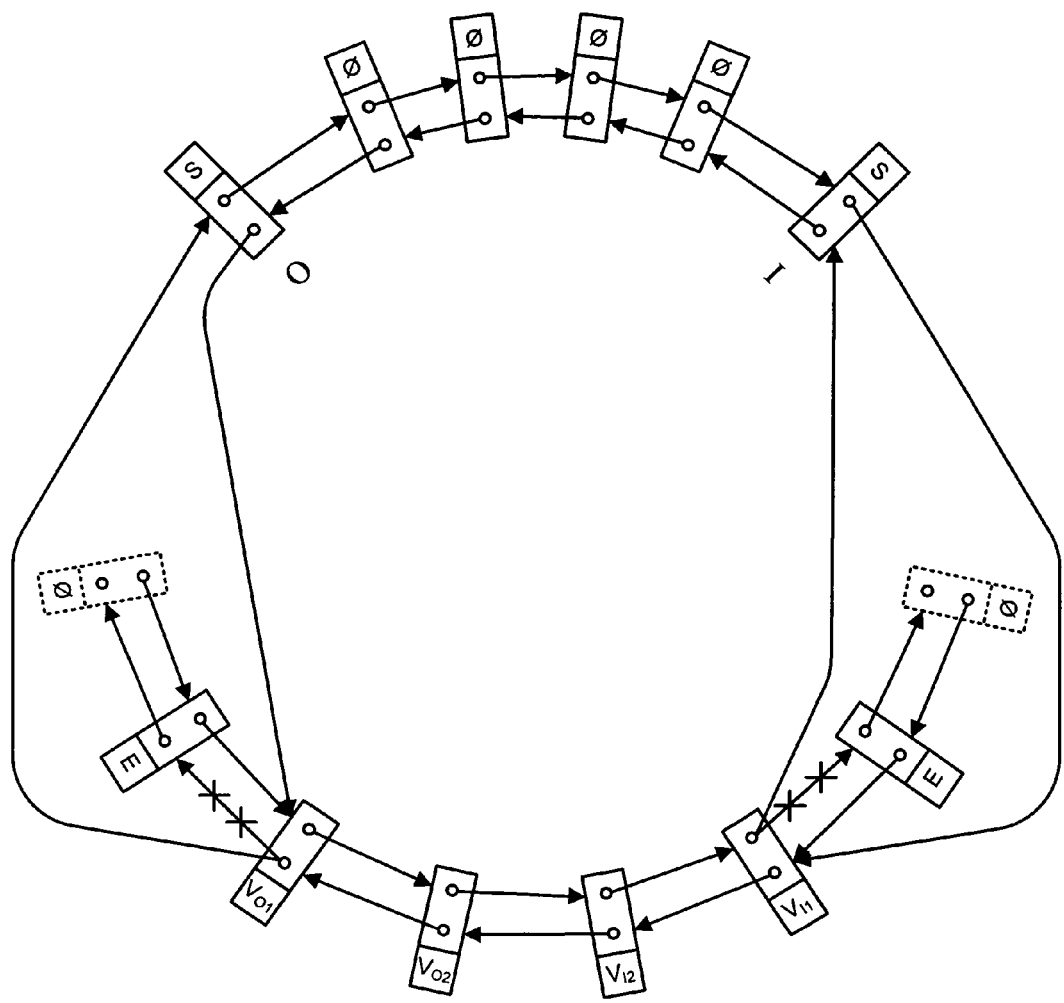
FIG. 26 illustrates fixing old ring pointers during a ring-shrinking operation in accordance with an embodiment of the present invention.

When the spurs are tagged, the "outward" pointers in the main ring are corrected by a DCAS that predicts they still point to the spurs and moves them to point to the ends of the new bubble (see FIG. 26). Again, this is attempted once as all contending threads are seeking the same result. Finally, the splice in progress markers (the "S" values in the end nodes of the new bubble) are both changed by a DCAS to normal nulls. The splice is complete, and normal pushing and popping now uses the main ring and the former bubble as one coherent ring.

Push onto a Spur

Figure 27:
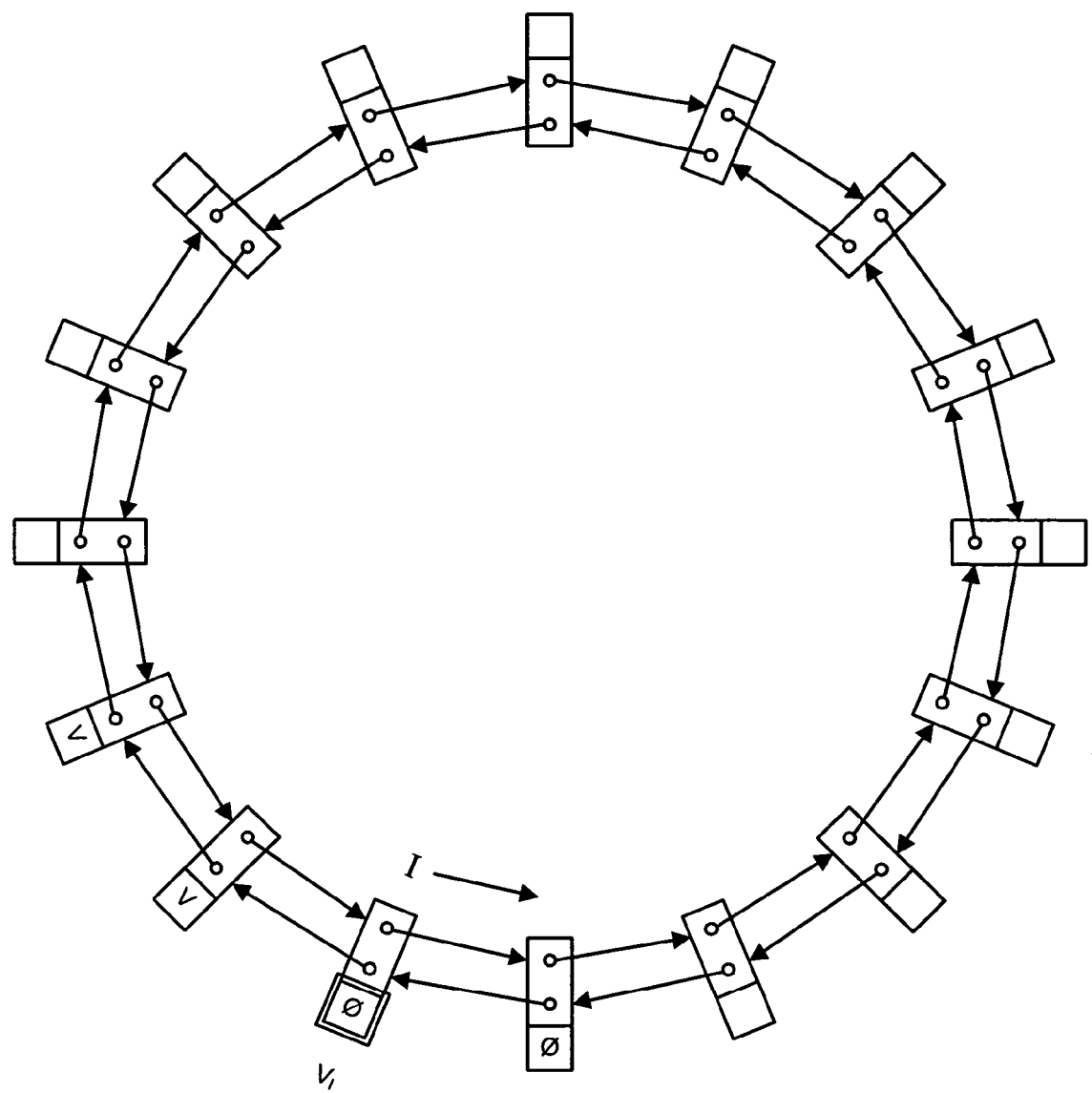
FIG. 27 illustrates a setup for an inner push operation in accordance with an embodiment of the present invention.
Figure 28:
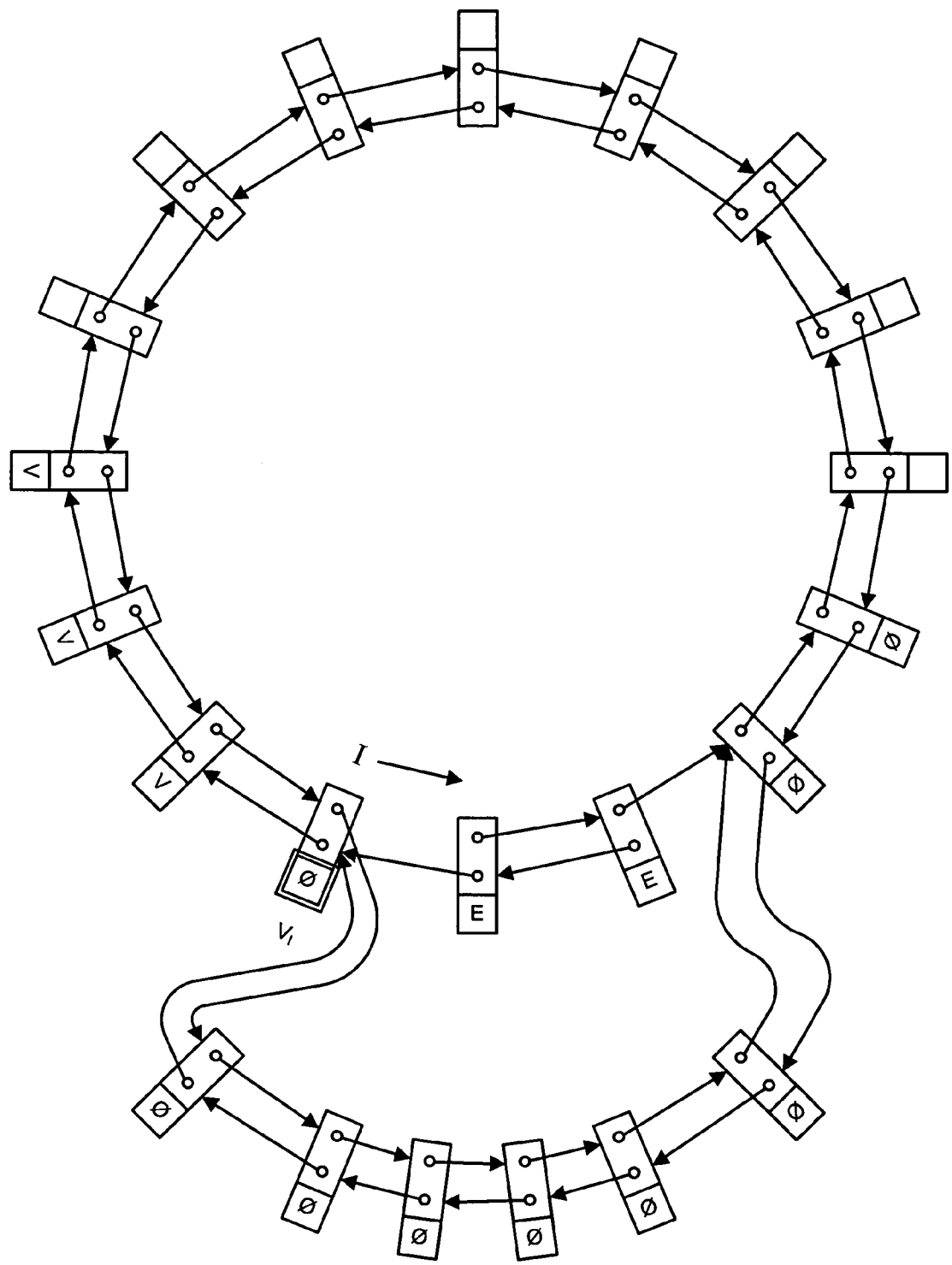
FIG. 28 illustrates an inner push to a remembered node in accordance with an embodiment of the present invention.
Figure 29:
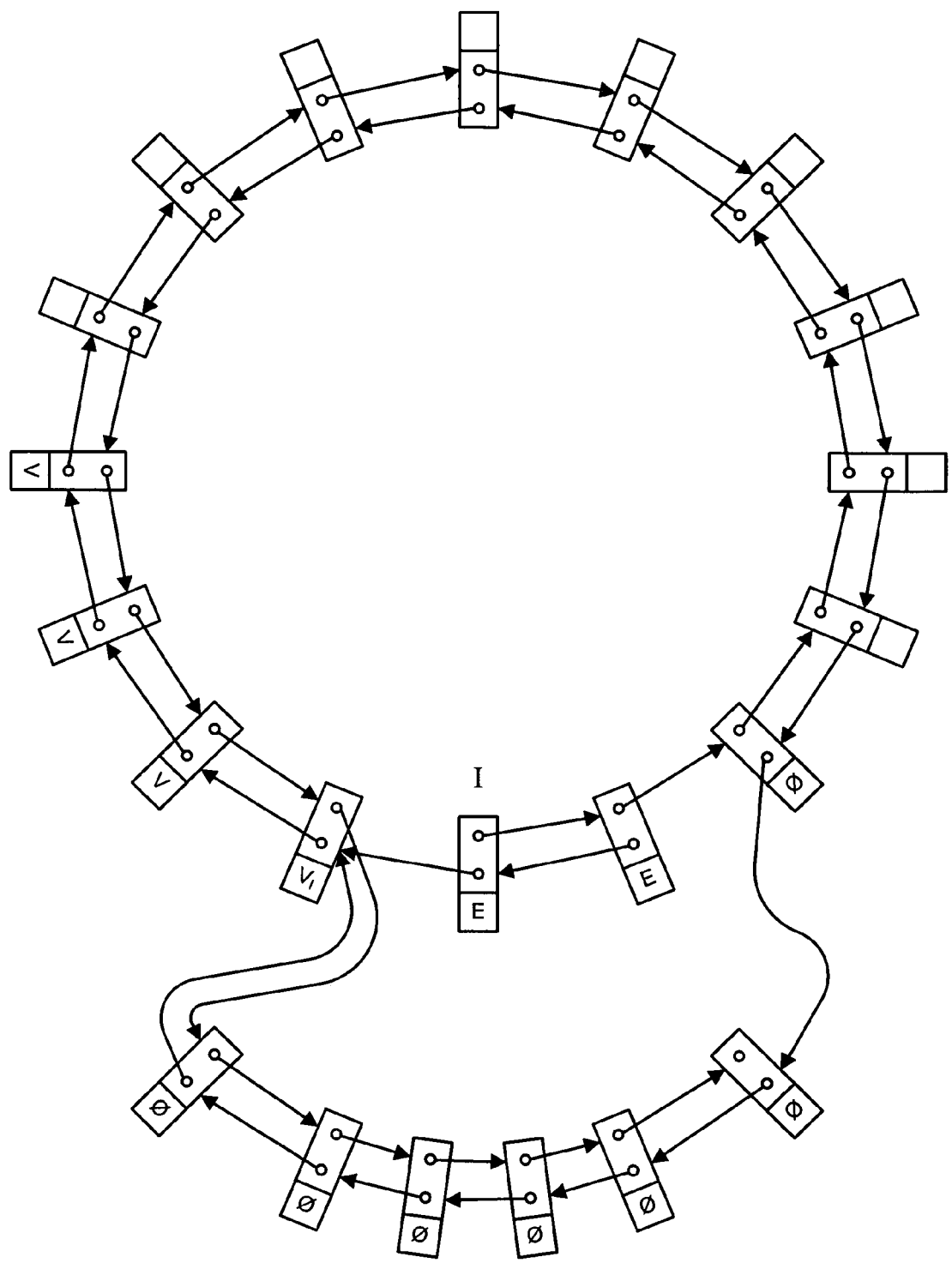
FIG. 29 illustrates an inner hat left on a spur in accordance with an embodiment of the present invention.

The remaining loose end is the possibility of a push trying to add a value to the ring, and in doing so moving the relevant hat onto a spur node. This can happen by having a push operation load the successor node address for a planned push (see FIG. 27), then wait so long that the node it plans to move the hat to is made a spur by subsequent splicing operations done by other threads (see FIG. 28). These other operations will necessarily move the hat, and that will usually cause the push DCAS to fail. It is possible though that the hat might be returned to the node that it was on during the setup, a node that no longer points to the now-spurred node, but once did. The push DCAS can successfully add the value "under the hat"

and move the hat onto the spur. The value is safely in the data structure, but the hat is in danger of wandering into nodes that are no longer part of the ring, and that would be bad indeed (see FIG. 29).

Hat on a Spur Node

Figure 30:
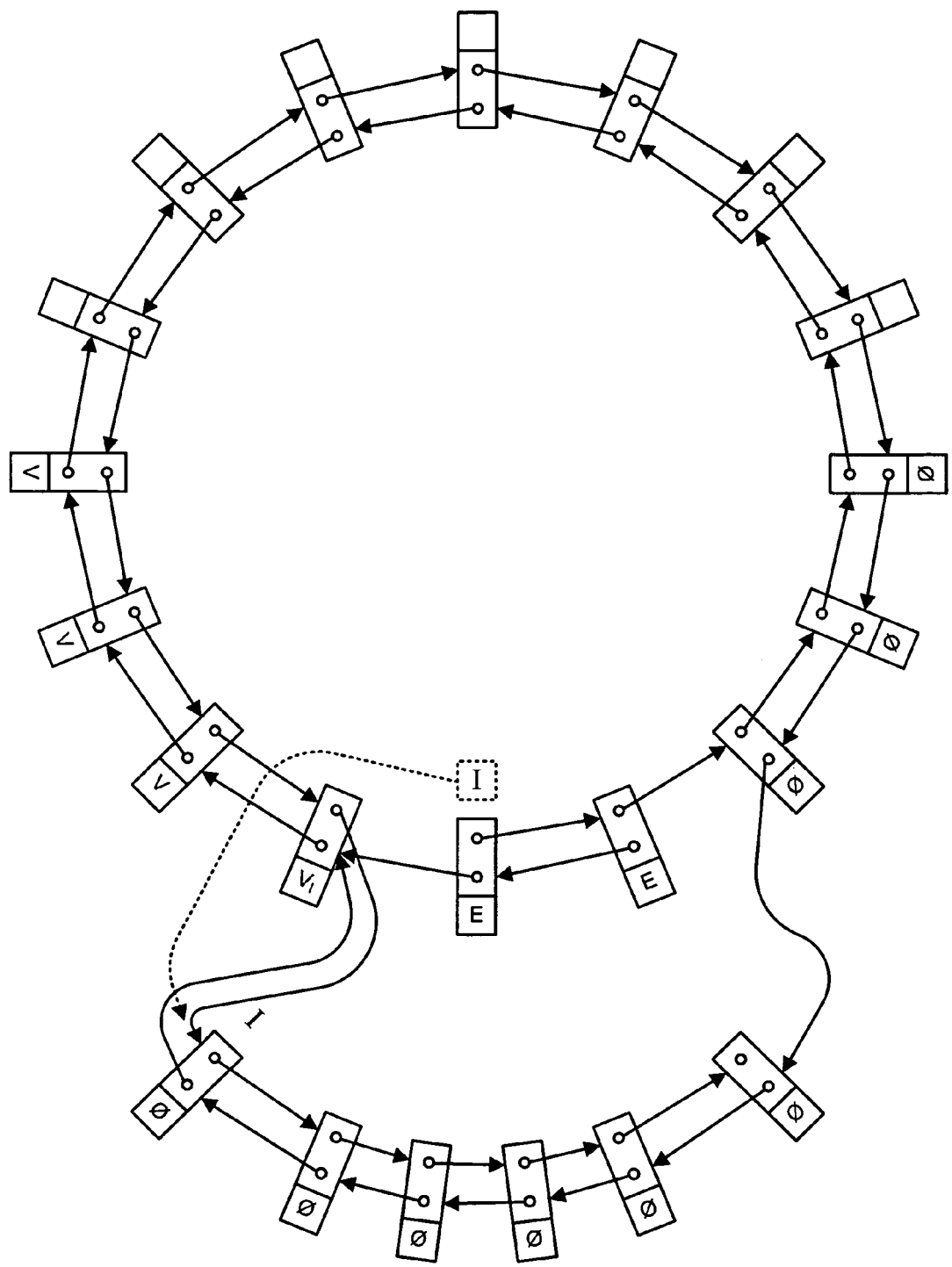
FIG. 30 illustrates how an inner hat is "unspurred" in accordance with an embodiment of the present invention.

A first step for each pop or push operation is to inspect the value stored "under the hat." If it indicates a splice in progress, then finishSplice is done before the push or pop operation is attempted (discussed above as). If it is marked as a spur ("E"), the hat must be moved to the more current successor of the predecessor node of the marked one (see FIG. 29). All spurs retain their back pointer to the main ring they were once a part of, so the operation to "unspur" a hat is to CAS the hat from the spur node to the current successor of the predecessor of the spur, finding this predecessor by following the pointer from the spurred node that is "backwards" for the particular hat; that is, the outer pointer when unspurring the Inner hat, and vice versa (see FIG. 30).

Life Cycle of Value Cells

Figure 31:
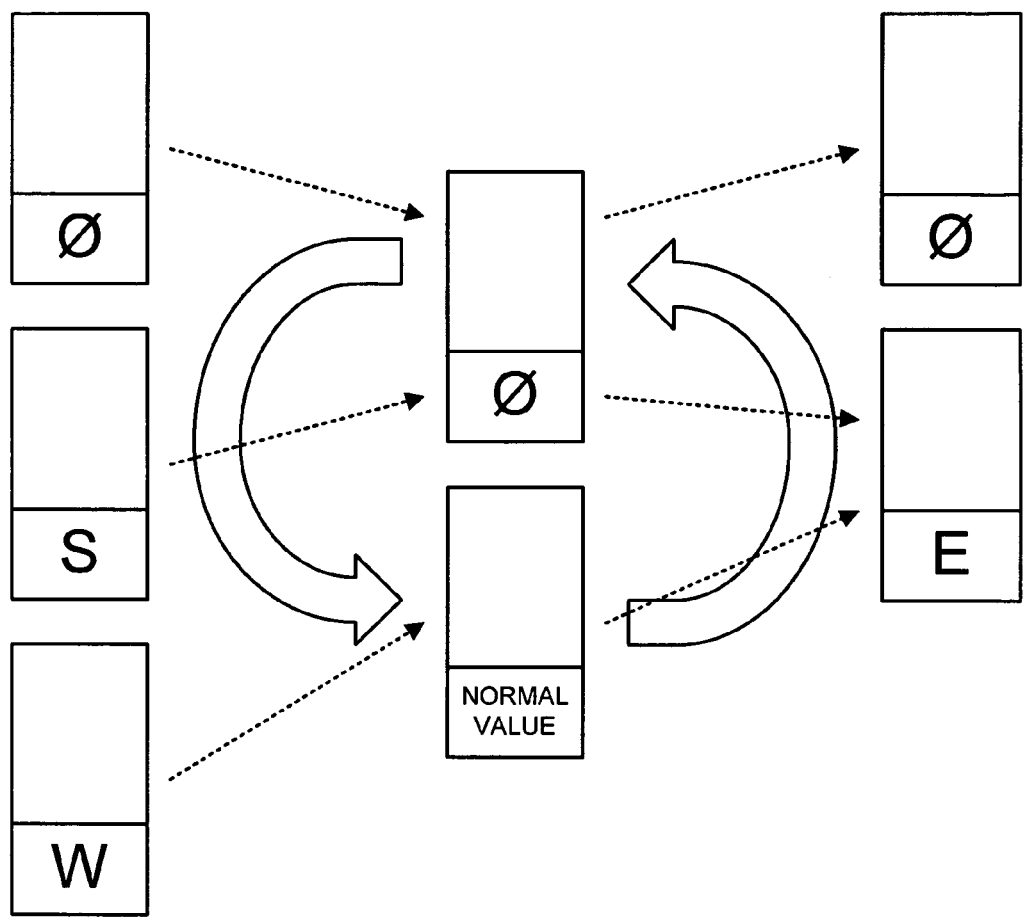
FIG. 31 illustrates a node value's life-cycle in accordance with an embodiment of the present invention.

FIG. 31 illustrates the life cycle of a node value. All value cells are initialized to null, and throughout their existence in the ring they are set to real data values by pushes and restored to null by pops. Once a cell in the inactive region is marked with the ring exclusion mark "E", however, it is never changed again; the value remains until all references in the ring and in live threads are removed, at which time garbage collection can claim that node.

While a new bubble has not been fully integrated, nodes in it may have special values for a period of their life cycle before they gain their first normal value. An "S" mark means a node is flagging a splice in progress, and will be replaced with a null when the splice is completed. A "W" mark means the node is a place holder for a real value that must be copied from the older ring. Once a special "W" is replaced by the real value or the special "S" value is replaced with a null, these values join the main stream life cycle and follow the basic rules above. These value restrictions are enforced by the push DCAS always predicting a null in the cell where a value is to be placed; a special mark "under" a hat is thus detected for special treatment.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for popping a value from a lock-free free double-ended queue (deque), the method comprising:
   receiving a command to pop a value from a selected end of the deque,
      wherein the deque is implemented as a doubly-linked list of nodes formed into a ring, so that node pointers in one direction form an inner ring, and node pointers in the other direction form an outer ring, and
      wherein the deque has an inner hat, which points to a node next to the last occupied node along the inner ring,
      wherein the deque has an outer hat, which points to a node next to the last occupied node along the outer ring; and
   in response to the command, attempting to perform a double compare-and-swap (DCAS) operation;
      wherein the DCAS operation predicts that the hat for the selected end of the deque remains unchanged and that the value in a node-to-be-popped located in a closest node to the hat in a popping direction remains unchanged, is not null and is not a special value; and
      wherein if this DCAS operation succeeds, the value is returned, the corresponding value field in the node-to-be-popped is set to null, and the hat is updated to point to the node that was popped from.

2. The method of claim 1, wherein the method further comprises pushing a new value onto the deque by:
   receiving a command to push the new value onto a selected end of the deque;
   in response to the command, attempting to perform a DCAS operation,
      wherein the DCAS operation predicts that the hat for the selected end remains unchanged and that the value in the node under the hat is null;
      wherein if the DCAS operation succeeds, the value in the node under the hat is updated with the new value, and the hat for the selected end is advanced in the pushing direction.

3. The method of claim 1, wherein the method further comprises growing the ring to increase the number of nodes that can be used in the deque by:
   removing a segment containing the inactive nodes, if any, from the ring; and
   splicing in a new segment containing a larger number of inactive nodes into the ring.

4. The method of claim 3, wherein splicing in the new segment involves:
   creating the new segment in a private memory area, wherein some nodes in the new segment are initialized to contain special values;
   pointing boundary nodes at the ends of the segment to "splice points" in the original ring;
   using a DCAS operation to "slam" both the inner hat and the outer hat onto the new segment, so that the inner hat and outer hat point to nodes in the new segment; and
   completing the splicing operation by copying values, if necessary, fixing pointers in the original ring, and updating special values as needed, wherein the splicing operation can be completed through other processes.

5. The method of claim 4, wherein the special values include:
   an E-marker, which indicates that the node is to be excluded from the resulting ring after splicing;
   an S-marker, which indicates that a splicing operation involving the node is still in-progress; and
   a W-marker, which indicates that data should be copied into the node during the splicing operation.

6. The method of claim 1, wherein the method further comprises shrinking the ring to decrease the number of nodes that can be used in the deque by:
   removing a segment containing the inactive nodes from the ring; and
   splicing in a new segment containing a smaller number of inactive nodes into the ring.

7. The method of claim 1, wherein the fact that the deque is lock-free means that the deque can be simultaneously accessed by multiple processes without requiring the processes to perform locking operations, and furthermore that a finite number of steps taken by a process will guarantee progress by at least one process.

8. The method of claim 1, wherein the method is performed by processes within a shared-memory multiprocessor system to improve system performance by facilitating lock-free operations on the deque.

9. The method of claim 8, wherein performing the DCAS operation involves executing a special-purpose DCAS instruction which is implemented by special-purpose hardware within the shared-memory multiprocessor system.

10. A computer-readable storage medium storing instructions that when executed by a computer cause the computer to perform a method for popping a value from a lock-free double-ended queue (deque), the method comprising:
  receiving a command to pop a value from a selected end of the deque,
    wherein the deque is implemented as a doubly-linked list of nodes formed into a ring, so that node pointers in one direction form an inner ring, and node pointers in the other direction form an outer ring, and
    wherein the deque has an inner hat, which points to a node next to the last occupied node along the inner ring,
    wherein the deque has an outer hat, which points to a node next to the last occupied node along the outer ring; and
  in response to the command, attempting to perform a double compare-and-swap (DCAS) operation;
  wherein the DCAS operation predicts that the hat for the selected end of the deque remains unchanged and that the value in a node-to-be-popped located in a closest node to the hat in a popping direction remains unchanged, is not null and is not a special value;
  wherein if this DCAS operation succeeds, the value is returned, the corresponding value field in the node-to-be-popped is set to null, and the hat is updated to point to the node that was popped from.

11. The computer-readable storage medium of claim 10, wherein the method further comprises pushing a new value onto the deque by:
  receiving a command to push the new value onto a selected end of the deque;
  in response to the command, attempting to perform a DCAS operation,
  wherein the DCAS operation predicts that the hat for the selected end remains unchanged and that the value in the node under the hat is null;
  wherein if the DCAS operation succeeds, the value in the node under the hat is updated with the new value, and the hat for the selected end is advanced in the pushing direction.

12. The computer-readable storage medium of claim 10, wherein the method further comprises growing the ring to increase the number of nodes that can be used in the deque by:
  removing a segment containing the inactive nodes, if any, from the ring; and
  splicing in a new segment containing a larger number of inactive nodes into the ring.

13. The computer-readable storage medium of claim 12, wherein splicing in the new segment involves:
  creating the new segment in a private memory area, wherein some nodes in the new segment are initialized to contain special values;
  pointing boundary nodes at the ends of the segment to "splice points" in the original ring;
  using a DCAS operation to "slam" both the inner hat and the outer hat onto the new segment, so that the inner hat and outer hat point to nodes in the new segment; and
  completing the splicing operation by copying values, if necessary, fixing pointers in the original ring, and updating special values as needed, wherein the splicing operation can be completed through other processes.

14. The computer-readable storage medium of claim 13, wherein the special values include:
  an E-marker, which indicates that the node is to be excluded from the resulting ring after splicing;
  an S-marker, which indicates that a splicing operation involving the node is still in-progress; and
  a W-marker, which indicates that data should be copied into the node during the splicing operation.

15. The computer-readable storage medium of claim 10, wherein the method further comprises shrinking the ring to decrease the number of nodes that can be used in the deque by:
  removing a segment containing the inactive nodes from the ring; and
  splicing in a new segment containing a smaller number of inactive nodes into the ring.

16. The computer-readable storage medium of claim 10, wherein the fact that the deque is lock-free means that the deque can be simultaneously accessed by multiple processes without requiring the processes to perform locking operations, and furthermore that a finite number of steps taken by a process will guarantee progress by at least one process.

17. The computer-readable storage medium of claim 10, wherein the method is performed by processes within a shared-memory multiprocessor system to improve system performance by facilitating lock-free operations on the deque.

18. The computer-readable storage medium of claim 17, wherein performing the DCAS operation involves executing a special-purpose DCAS instruction which is implemented by special-purpose hardware in a shared-memory multiprocessor system.

19. An apparatus that supports popping a value from a lock-free double-ended queue (deque), the method comprising:
  a shared-memory multiprocessor system;
  a command-processing mechanism within the shared-memory multiprocessor system configured to receive a command to pop a value from a selected end of the deque,
    wherein the deque is implemented as a doubly-linked list of nodes formed into a ring, so that node pointers in one direction form an inner ring, and node pointers in the other direction form an outer ring, and
    wherein the deque has an inner hat, which points to a node next to the last occupied node along the inner ring,
    wherein the deque has an outer hat, which points to a node next to the last occupied node along the outer ring; and
  wherein in response to the pop command, the command-processing mechanism is configured to attempt to perform a double compare-and-swap (DCAS) operation;
  wherein the DCAS operation predicts that the hat for the selected end of the deque remains unchanged and that the value in a node-to-be-popped located in a closest node to the hat in a popping direction remains unchanged, is not null and is not a special value;
  wherein if this DCAS operation succeeds, the value is returned, the corresponding value field in the node-to-be-popped is set to null, and the hat is updated to point to the node that was popped from.

20. The apparatus of claim 19,
  wherein the command-processing mechanism is additionally configured to receive a command to push a new value onto a selected end of the deque; and
  wherein in response to the push command, the command-processing mechanism is configured to attempt to perform a DCAS operation,
  wherein the DCAS operation predicts that the hat for the selected end remains unchanged and that the value in the node under the hat is null;
  wherein if the DCAS operation succeeds, the value in the node under the hat is updated with the new value, and the hat for the selected end is advanced in the pushing direction.

21. The apparatus of claim 19, wherein the command-processing mechanism is additionally configured to grow the ring to increase the number of nodes that can be used in the deque, wherein while growing the ring the command-processing mechanism is configured to:
  remove a segment containing the inactive nodes, if any, from the ring; and to
  splice in a new segment containing a larger number of inactive nodes into the ring.

22. The apparatus of claim 19, wherein the command-processing mechanism is additionally configured to shrink the ring to decrease the number of nodes that can be used in the deque, wherein while shrinking the ring the command-processing mechanism is configured to:
  remove a segment containing the inactive nodes from the ring; and to
  splice in a new segment containing a smaller number of inactive nodes into the ring.

* * * * *

UNITED STATES PATENT AND TRADEMARK OFFICE
CERTIFICATE OF CORRECTION

| | | |
|---|---|---|
| PATENT NO. | : 7,583,687 B2 | Page 1 of 1 |
| APPLICATION NO. | : 11/325209 | |
| DATED | : September 1, 2009 | |
| INVENTOR(S) | : Paul A. Martin et al. | |

It is certified that error appears in the above-identified patent and that said Letters Patent is hereby corrected as shown below:

In claim 1 (at column 11, line 52), please delete the duplicated word "free" at the end of the line so that the line reads: --A method for popping a value from a lock-free--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,583,687 B2 Page 1 of 1
APPLICATION NO. : 11/325209
DATED : September 1, 2009
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Fourteenth Day of September, 2010

David J. Kappos
*Director of the United States Patent and Trademark Office*